United States Patent
Watanabe

(10) Patent No.: US 7,177,972 B2
(45) Date of Patent: Feb. 13, 2007

(54) PERIPHERALS OF COMPUTER

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 101 days.

(21) Appl. No.: 11/113,996

(22) Filed: Apr. 26, 2005

(65) Prior Publication Data

US 2005/0240711 A1  Oct. 27, 2005

(30) Foreign Application Priority Data

Apr. 27, 2004 (JP) .............................. 2004-132008

(51) Int. Cl.
*G06F 13/00* (2006.01)
*G06F 13/20* (2006.01)

(52) U.S. Cl. ...................... 710/313; 710/316
(58) Field of Classification Search ................ 710/313, 710/316
See application file for complete search history.

(56) References Cited

U.S. PATENT DOCUMENTS

| | | | |
|---|---|---|---|
| 6,473,811 B1* | 10/2002 | Onsen ........................ 710/15 |
| 6,480,916 B1* | 11/2002 | Shishizuka et al. ......... 710/107 |
| 2004/0148450 A1* | 7/2004 | Chen et al. .................. 710/313 |
| 2004/0260850 A1* | 12/2004 | Yu et al. ..................... 710/104 |
| 2005/0270557 A1* | 12/2005 | Ookuma .................... 358/1.13 |
| 2006/0020729 A1* | 1/2006 | Nakamura et al. .......... 710/113 |

FOREIGN PATENT DOCUMENTS

JP  2001-222503  8/2001

* cited by examiner

*Primary Examiner*—Paul R. Myers
*Assistant Examiner*—Jeremy S. Cerullo
(74) *Attorney, Agent, or Firm*—Rabin & Berdo, P.C.

(57) ABSTRACT

A peripheral for notifying a USB-connected upper apparatus of a device descriptor and allowing the upper apparatus to specify a communication partner destination by the function information shown in the device descriptor has: a peripheral function information holding unit which holds function information showing functions of the peripheral; a dependent peripheral function information holding unit which holds function information showing functions of a USB-connected dependent peripheral; and a USB control unit which reads out one of the function information held in those holding units by a selecting instruction and notifies the upper apparatus of the device descriptor in which the read-out function information is shown. A peripheral which can realize a multi-function without developing a dedicated driver and installing it into a PC is provided.

20 Claims, 24 Drawing Sheets

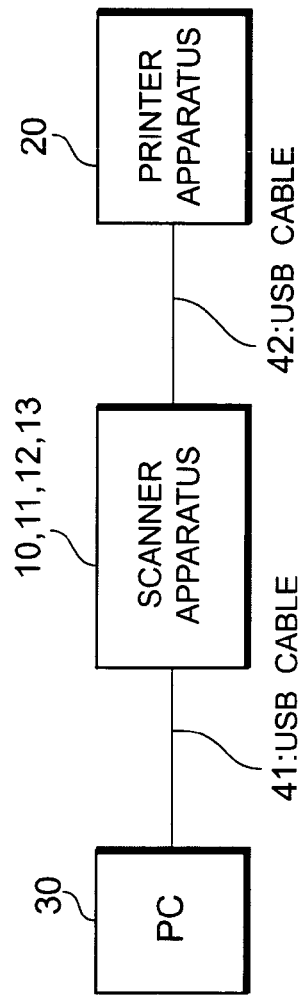
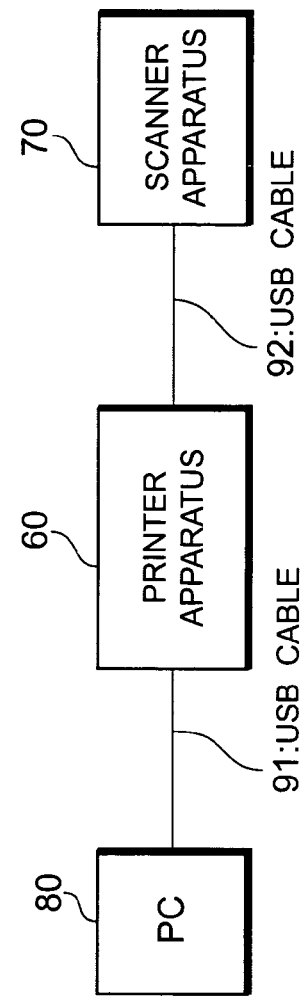

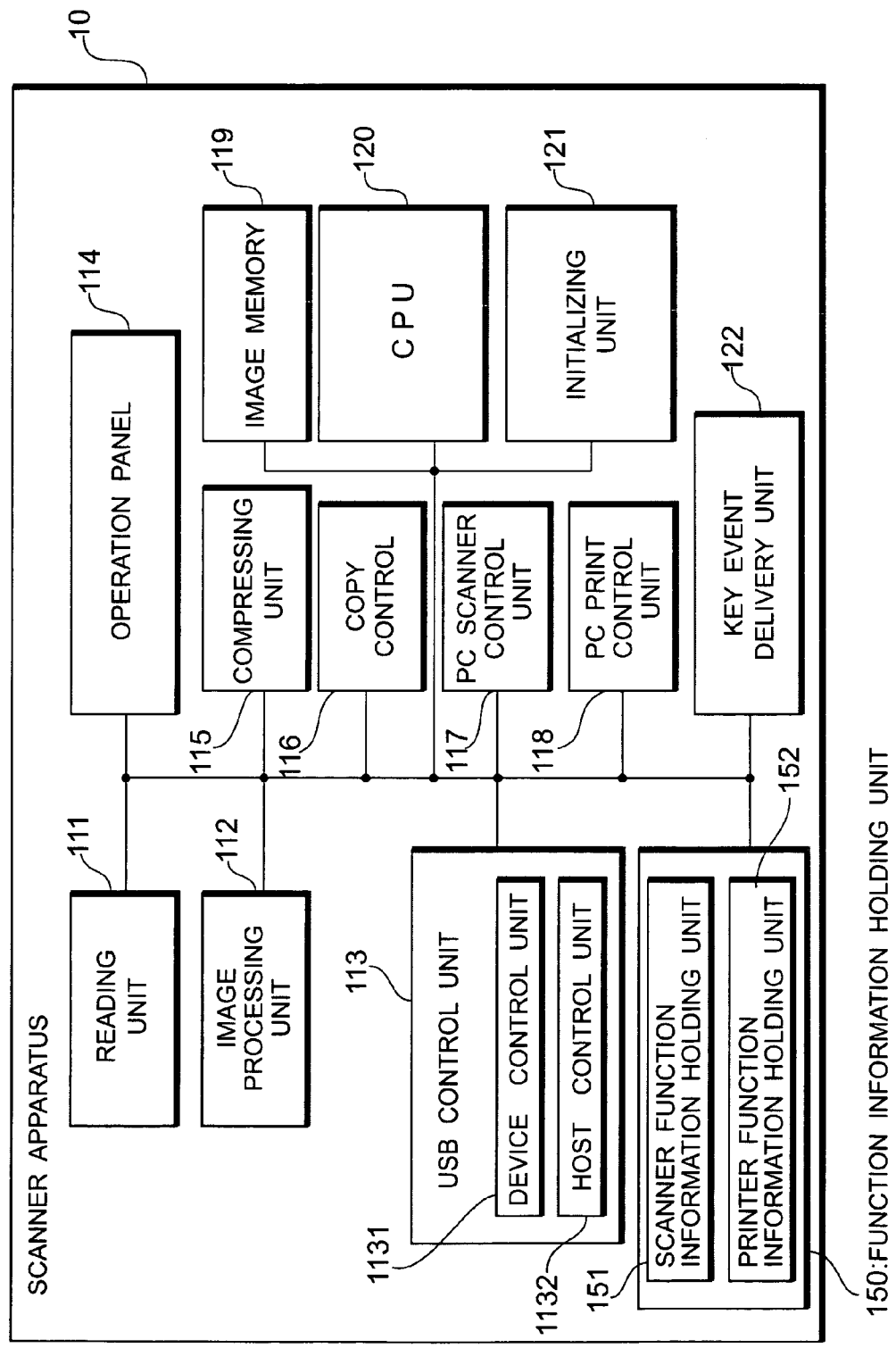

PERIPHERALS OF COMPUTER

BACKGROUND OF THE INVENTION

1. Field of the Invention

The invention relates to peripherals which are connected to an upper apparatus through a USB (Universal Serial Bus) interface and, more particularly, to peripherals for realizing multi-function.

2. Related Background Art

An upper apparatus (hereinafter, referred to as a PC (personal computer)) having a USB-connecting function can be connected and disconnected to/from peripherals in the state where the PC operates (state where a power source is ON) and, further, can be connected in parallel to a plurality of peripherals. Therefore, since the USB-connection is easily detachable and a system can be relatively freely constructed, the USB-connection has been widespread. The peripheral added by the USB-connection is recognized by the PC at the moment when it is physically connected to the PC. The PC which recognized the peripheral searches for a driver of the recognized peripheral from drivers which it already has and makes device definition by the searched driver in order to control the peripheral.

As a connection control function of the peripheral mentioned above, an inserting/removing function of the peripherals called a "plug & play (PinP) function" has been known. The plug & play function is realized as will be explained hereinbelow. When the peripheral is USB-connected to the PC, the PC recognizes the USB-connected peripheral (device), automatically searches for a necessary device driver, and activates the corresponding driver, thereby enabling the added peripheral to be used. Specifically speaking, when the PC detects the USB-connection of the peripheral, a bus for USB-connecting the PC and the peripheral is reset, and after the bus resetting, the PC and the peripheral start communication called a "control transfer".

In the control transfer, the peripheral notifies the PC of information called a device descriptor necessary for the device definition. Function information indicative of functions of the peripheral is shown in the device descriptor. The PC specifies the peripheral as a communication partner destination on the basis of the function information indicative of the functions of the peripheral shown in the device descriptor, makes the device definition for allocating an address called an "end point" to the specified peripheral, and starts USB-communication with the peripheral.

Multi-function peripherals (hereinbelow, referred to as MFP) having a plurality of functions such as scanner function, printer function, facsimile (FAX) function, and the like have been widespread as peripherals. Also in the case of USB-connecting the MFP to the PC and making USB-communication, the PC is notified of the device descriptor showing the plurality of functions provided for the MFP by the control transfer.

For example, as shown in JP-A-2001-222503, in order to select a desired function from the plurality of functions shown in the device descriptor, the PC which received the notification issues a switching command of a connecting construction (vendor request) called a "configuration" and makes the device definition.

In the conventional system, however, since the dedicated driver for selecting the desired function from the plurality of functions and issuing the switching command of the connecting construction is needed and it is necessary to develop such a dedicated driver and install it into the PC as mentioned above, they cause a problem.

SUMMARY OF THE INVENTION

It is, therefore, an object of the invention to provide peripherals which can realize multi-function without developing a dedicated driver and installing it into the PC.

According to the present invention, there is provided a peripheral for notifying a USB-connected upper apparatus of a device descriptor and allowing the upper apparatus to specify a communication partner destination on the basis of function information shown in the device descriptor, comprising:

a peripheral function information holding unit which holds function information indicative of functions of the peripheral;

a dependent peripheral function information holding unit which holds function information indicative of functions of a dependent peripheral which is USB-connected; and a USB control unit which reads out either the function information held in the peripheral function information holding unit or the function information held in the dependent peripheral function information holding unit on the basis of a selecting instruction and notifies the upper apparatus of the device descriptor in which the read-out function information is shown.

In the present invention, the peripheral may be an image reading apparatus and the dependent peripheral may be an image forming apparatus. In this case, the peripheral function information holding unit holds the function information indicative of an image reading function, and the dependent peripheral function information holding unit holds the function information indicative of an image forming function.

Further, when the peripheral is an image forming apparatus and the dependent peripheral is an image reading apparatus, the peripheral function information holding unit holds the function information indicative of an image forming function, and the dependent peripheral function information holding unit holds the function information indicative of an image reading function.

In the present invention, the peripheral further comprises an operation panel which receives the selecting instruction, and wherein when the selecting instruction is received by the operation panel, the USB control unit executes bus resetting in the USB-connection with the upper apparatus before the notification of the device descriptor.

In the peripheral, the USB control unit has a multi-device descriptor forming unit which forms the device descriptor in which the function information which is read out based on the selecting instruction is contained.

Moreover, the peripheral may further comprise an original reading unit which reads an original, and wherein when it is detected that the original has been arranged, the original reading unit notifies the USB control unit of an original detection signal as the selecting instruction, and when the original detection signal is received, the USB control unit reads out the function information indicative of the image reading function.

Moreover, the peripheral may further comprise a timer which notifies the USB control unit of a left-original detection signal as the selecting instruction when it is detected that the original has been arranged and left, and wherein when the left-original detection signal is received, the USB control unit reads out the function information indicative of the image forming function.

Moreover, in the peripheral, the original reading unit reads out the arranged original and, when it is detected that there are no originals to be read, notifies the USB control unit of an end detection signal as the selecting instruction, and when the end detection signal is received, the USB control unit reads out the function information indicative of the image forming function.

Moreover, the peripheral may further comprise a specific information extracting unit which analyzes a control command from the upper apparatus and extracts specific information, and wherein when an instruction to execute bus resetting in the USB-connection with the upper apparatus is shown in the extracted specific information, the USB control unit executes the bus resetting.

Moreover, the peripheral may further comprise a specific information extracting unit which analyzes a control command from the upper apparatus and extracts specific information, and wherein when the specific information is a command described by a control language of an image reading apparatus, the specific information extracting unit notifies the USB control unit of the command as the selecting instruction, and when the command is received, the USB control unit reads out the function information indicative of the image reading function.

Moreover, the peripheral may further comprise a specific information extracting unit which analyzes a control command from the upper apparatus and extracts specific information, and wherein when the specific information is a command described by a control language of an image forming apparatus, the specific information extracting unit notifies the USB control unit of the command as the selecting instruction, and when the command is received, the USB control unit reads out the function information indicative of the image forming function.

Moreover, in the peripheral, when information showing that a process based on the command has been finished is received as the selecting instruction, on the basis of the command, the USB control unit reads out the other function information which is not read out.

Moreover, in the peripheral, the USB-connection with the upper apparatus is hot plug-in connection, bus resetting in the USB-connection is executed by the hot plug-in connection.

Further, according to the present invention, there is provided a peripheral for notifying a USB-connected upper apparatus of a device descriptor and allowing the upper apparatus to specify a communication partner destination on the basis of function information shown in the device descriptor, comprising:

a peripheral function information holding unit which holds function information indicative of functions of the peripheral;

a dependent peripheral function information holding unit which holds function information indicative of functions of a dependent peripheral which is USB-connected; and a USB control unit which reads out either the function information held in the peripheral function information holding unit or the function information held in the dependent peripheral function information holding unit on the basis of a selecting instruction and notifies the upper apparatus of the device descriptor in which the read-out function information is contained, wherein the USB control unit has a host control section which executes a relay for communicating between the upper apparatus and the dependent peripheral, when the dependent peripheral is specified as the communication partner destination by the upper apparatus.

Moreover, in the peripheral, the peripheral may be a scanner; the dependent peripheral may be a printer.

According to the invention, by notifying the upper apparatus of the device descriptor showing either the function information indicative of the functions of the peripheral or the function information indicative of the functions of the dependent peripheral which is USB-connected to the peripheral on the basis of the selecting instruction, the upper apparatus specifies the communication partner destination on the basis of the single function information since only one function information is shown in the device descriptor. Thus, the dedicated driver to issue the switching command of the connecting construction is unnecessary in the upper apparatus and troublesomeness to install the dedicated driver into the PC can be eliminated.

The above and other objects and features of the present invention will become apparent from the following detailed description and the appended claims with reference to the accompanying drawings.

BRIEF DESCRIPTION OF THE DRAWINGS

FIG. 1 is a constructional diagram of a system 1 according to the invention;

FIG. 2 is a constructional diagram of a scanner apparatus in the embodiment 1;

FIG. 21 is a constructional diagram of a system 2 according to the invention;

DETAILED DESCRIPTION OF THE PREFERRED EMBODIMENTS

Figure 3:
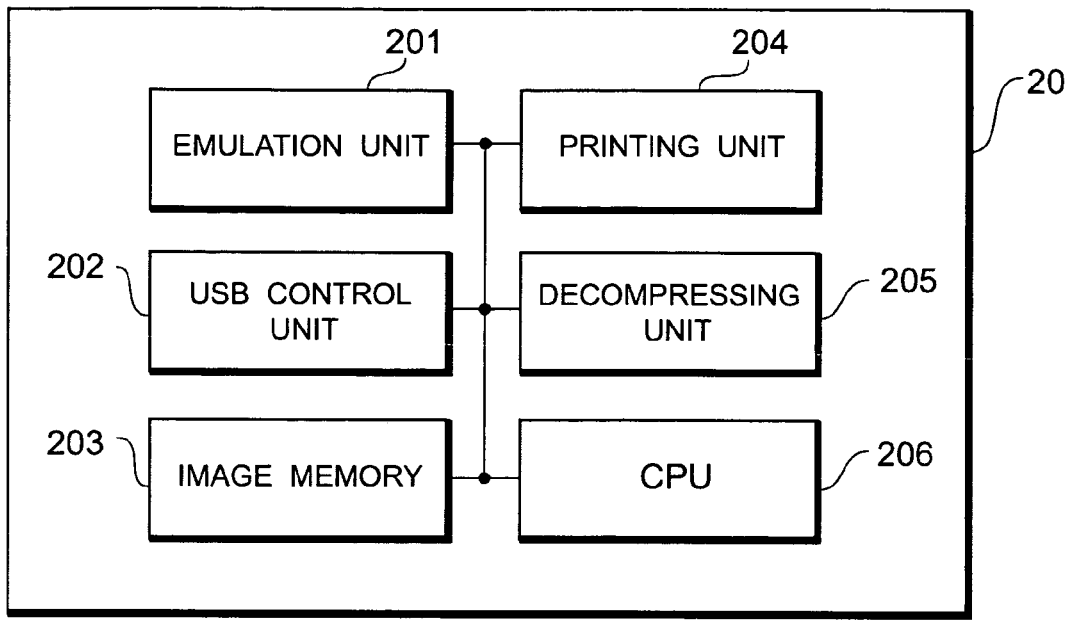
FIG. 3 is a constructional diagram of a printer apparatus which is used in the system 1.

Embodiments of the invention will now be described in detail with reference to the drawings. In the following description, it is assumed that the same or corresponding component elements shown in the drawings which are used for explaining the embodiments are designated by the same reference numerals and their overlapped explanation is omitted as much as possible.

[Embodiment 1]

An image reading apparatus as a peripheral of the invention is a scanner apparatus 10. As shown in FIG. 1, the scanner apparatus 10 is connected to a PC 30 as an upper apparatus through a USB cable 41 and further connected to an image forming apparatus (printer apparatus 20) as a dependent peripheral through a USB cable 42.

An essence of the invention will now be described.

In the scanner apparatus 10 of the invention, as shown in FIG. 2, function information indicative of functions of the scanner apparatus 10 and function information indicative of functions of the printer apparatus 20 which is USB-connected to the scanner apparatus have previously been held in a function information holding unit 150. On the basis of a selecting instruction, the scanner apparatus 10 reads out only one of the function information held in the function information holding unit 150. A device descriptor in which the read-out function information is shown is formed by a USB control unit 113. The PC 30 is notified of the device descriptor. Thus, the PC 30 can specify a communication partner destination on the basis of one function information shown in the device descriptor. A dedicated driver to select the function and issue a switching command of a connecting construction (vendor request) is unnecessary.

In the subsequent embodiments, examples in which the function information is previously held and the device descriptor in which the read-out function information is shown is formed and notified to the PC 30 will be explained. It is also possible to construct in such a manner that the device descriptor in which the scanner function information indicating the functions of the scanner apparatus 10 is shown and the device descriptor in which the printer function information indicating the functions of the printer apparatus 20 is shown are previously held and the held device descriptor is selected on the basis of the selecting instruction and notified to the PC 30.

As shown in FIG. 2, the scanner apparatus 10 is constructed by: a reading unit 111 for reading an original; an image processing unit 112 for executing an image process to the read-out image; the USB control unit 113 which functions as one of USB devices with respect to the PC 30, functions as a hub (HUB) with respect to the printer apparatus 20, and is used for making USB-communication in accordance with a USB protocol; an operation panel 114 having a plurality of keys for allowing the operator to execute the operation setting of the scanner apparatus 10 and the like; a compressing unit 115 for compressing data formed by reading the original; a copy control unit 116 for making the printer apparatus 20 operative on the basis of the data obtained by reading the original, thereby allowing the original to be copied; a PC scanner control unit 117 for controlling the operation as a scanner on the basis of a control command from the PC 30; a PC print control unit 118 which makes control as a PC print for receiving the print data and the control command from the PC 30, transferring the received data and control command to the printer apparatus 20, and allowing the printer apparatus 20 to execute the printing; an image memory 119 which is used as a work area for holding the data obtained by reading the original and executing the image process and a compressing process; an initializing unit 121 for forming either a device descriptor for the scanner (hereinafter, referred to as a scanner device descriptor) or a device descriptor for the printer (hereinafter, referred to as a printer device descriptor) at the time of initialization and transmitting the formed device descriptor to the PC 30; a key event delivery unit 122 for notifying a device control unit 1131, which will be explained hereinafter, of the USB control unit 113 that an arbitrary key on the operation panel 114 has been depressed; and the function information holding unit 150 for holding the scanner function information and printer function information, which will be explained hereinafter.

A CPU 120 makes substantial control of each of the above-mentioned units on the basis of programs held in a ROM (not shown). For simplicity of explanation, the scanner apparatus 10 will be described with respect to each of the foregoing functional blocks.

As shown in FIG. 3, the printer apparatus 20 which is connected to the scanner apparatus 10 by the USB cable 42 has: an emulation unit 201 for analyzing a printer language; a USB control unit 202 for transmitting and receiving the print data and control command between the scanner apparatus 10 and the printer apparatus 20 by USB-communication; an image memory 203 for storing the print data; a printing unit 204 for controlling a print engine to execute the printing process; and a decompressing unit 205 for decompressing the compressed print data which is transmitted.

A CPU 206 makes substantial control of each of the above-mentioned units on the basis of programs held in the ROM (not shown). For simplicity of explanation, the printer apparatus 20 will be described with respect to each of the foregoing functional blocks.

The function information holding unit 150 of the scanner apparatus 10 has: a scanner function information holding unit 151 for holding the function information indicative of the functions of the scanner apparatus 10; and a printer function information holding unit 152 for holding the function information indicative of the functions of the printer apparatus 20. Either the function information held in the scanner function information holding unit 151 or the function information held in the printer function information holding unit 152 is read out when the device descriptor, which will be explained hereinafter, is formed.

Figure 4:
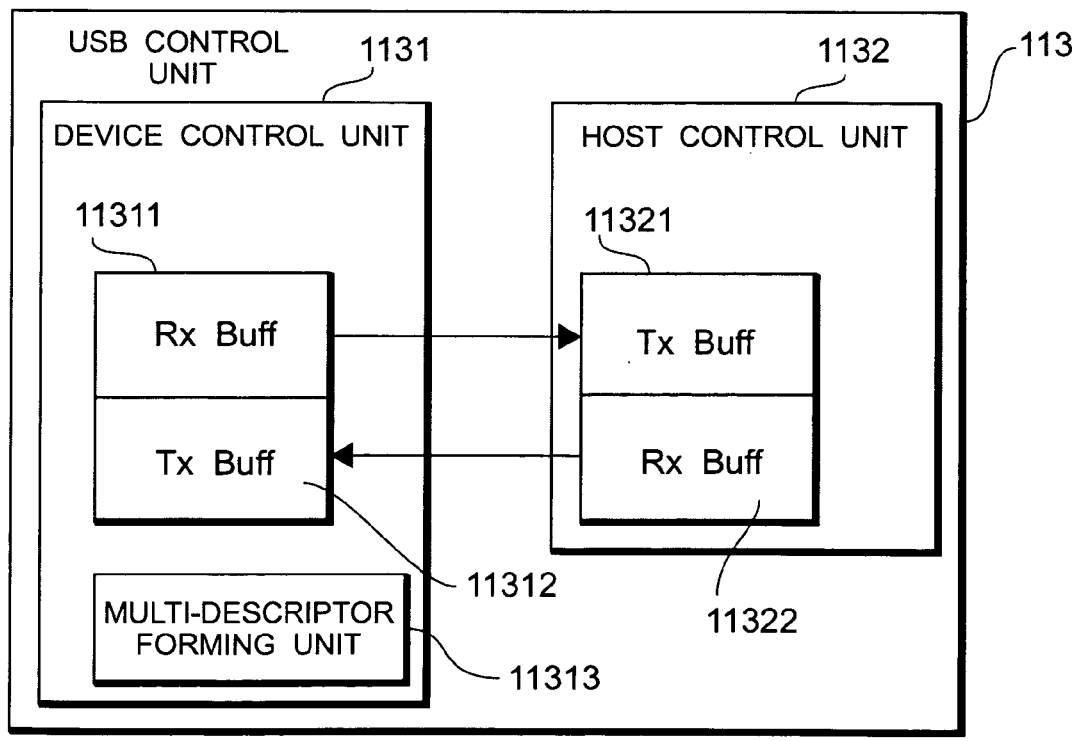
FIG. 4 is a constructional diagram of a USB control unit of the scanner apparatus in the embodiment 1.

As shown in FIG. 4, the USB control unit 113 of the scanner apparatus 10 is constructed by: the device control unit 1131 for functioning as one of the USB devices; and a host control unit 1132 for functioning as a hub.

The host control unit 1132 has: a Tx buffer (Tx Buff) 11321 for transmitting the data to the printer apparatus 20; and an Rx buffer (Rx Buff) 11322 for receiving the data from the printer apparatus 20.

The device control unit 1131 has: an Rx buffer (Rx Buff) 11311 for receiving the data from the PC 30; a Tx buffer (Tx Buff) 11312 for transmitting the data to the PC 30; and a multi-descriptor forming unit 11313 having a plurality of descriptor forming units (not shown) each for forming a device descriptor, which will be explained hereinafter. When the PC 30 and the printer apparatus 20 make the USB-communication, the data held in the Rx buffer 11311 is transferred to the Tx buffer 11321 and the data held in the Rx buffer 11322 is transferred to the Tx buffer 11312.

When the operator presses the key (on the operation panel 114) which instructs the USB-communication between the PC 30 and the printer apparatus 20, a device descriptor in which the printer function information, which will be explained hereinafter, is shown is formed. The PC 30 is notified of the device descriptor. After that, the foregoing transfer control is made.

Figure 5:
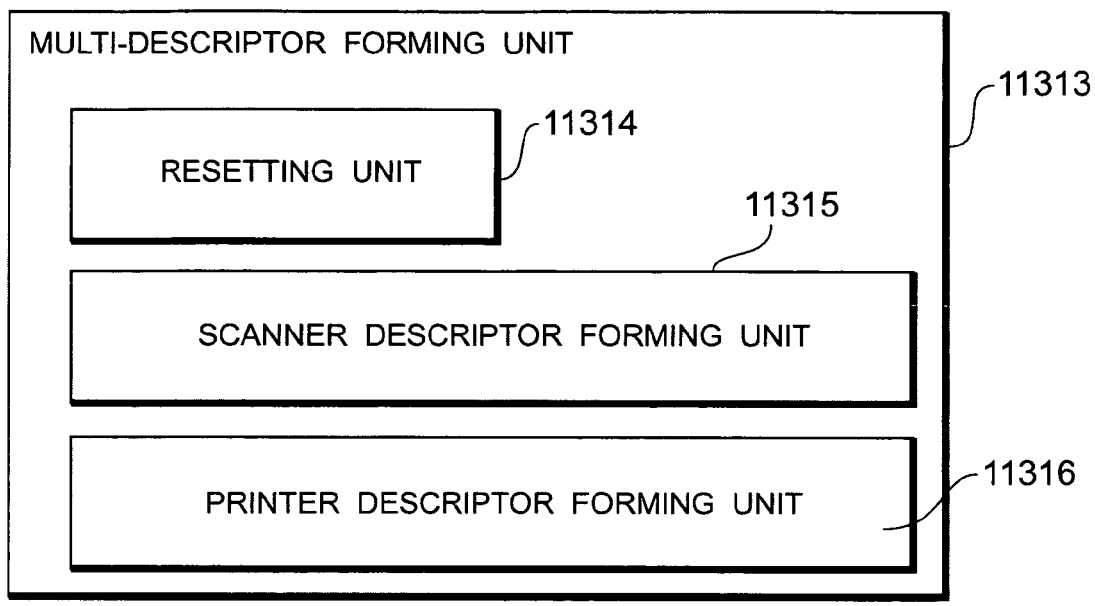
FIG. 5 is a constructional diagram of a multi-descriptor forming unit in the USB control unit.

The multi-descriptor forming unit 11313 will now be described. As shown in FIG. 5, the multi-descriptor forming unit 11313 is constructed by: a resetting unit 11314 for executing bus resetting in the USB-connection; a scanner descriptor forming unit 11315 for forming a device descriptor for the scanner (hereinafter, referred to as a scanner device descriptor); and a printer descriptor forming unit 11316 for forming a device descriptor for the printer (hereinafter, referred to as a printer device descriptor).

To allow the PC 30 to control the scanner apparatus 10 by the scanner function, the scanner descriptor forming unit 11315 reads out the scanner function information from the scanner function information holding unit 151 in the function information holding unit 150 and forms the device descriptor in which the scanner function information is shown.

To allow the PC 30 to control the printer apparatus 20 by the printer function through the scanner apparatus 10, the printer descriptor forming unit 11316 reads out the printer function information from the printer function information holding unit 152 in the function information holding unit 150 and forms the device descriptor in which the printer function information is shown. In this manner, the device descriptor is formed in accordance with the function to be controlled by the PC 30. The formed device descriptor is notified to the PC after the bus resetting in the USB-connection. The PC which received the notification specifies the communication partner destination on the basis of the function information shown in the device descriptor (makes device definition).

When the selecting instruction is received from the operator, the operation panel 114 outputs a selection signal according to the instruction to the USB control unit 113. The multi-descriptor forming unit 11313 of the USB control unit 113 which received the selection signal activates either the scanner descriptor forming unit 11315 or the printer descriptor forming unit 11316 on the basis of the selection signal. In other words, when the operator presses a use button of the scanner apparatus 10 by the operation panel 114, the scanner descriptor forming unit 11315 is activated and, when he presses a use button of the printer apparatus 20, the printer descriptor forming unit 11316 is activated.

The operation panel 114 for outputting the selection signal will now be described.

Figure 6:
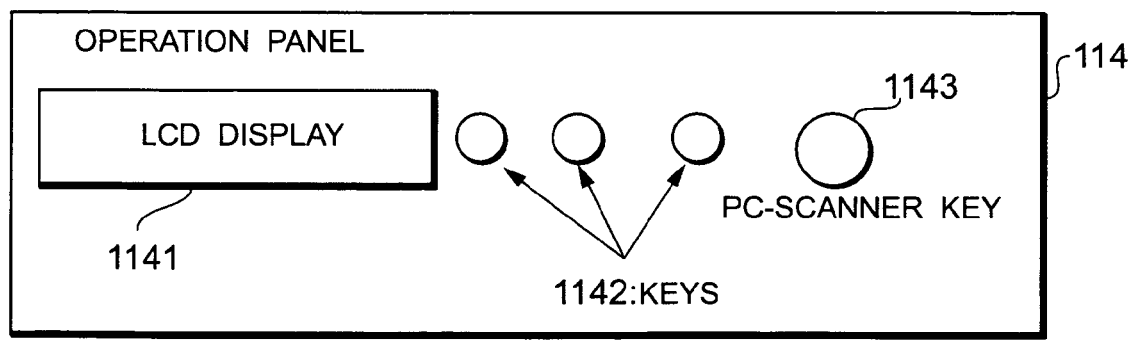
FIG. 6 is a layout example on the surface of an operation panel.

As shown in FIG. 6, the operation panel 114 of the scanner apparatus 10 has: an LCD display 1141 for allowing the operator to set the operation; a plurality of pressing keys 1142; and a PC-scanner key 1143.

In correspondence to depressed ones of the plurality of keys 1142, the operation panel 114 outputs the selection signal (selection information) according to the pressed keys to the USB control unit 113. On the basis of the received selection signal, the multi-descriptor forming unit 11313 in the USB control unit 113 selects either the scanner descriptor forming unit 11315 or the printer descriptor forming unit 11316 and activates the selected forming unit.

When the PC-scanner key 1143 is pressed, the operation panel 114 outputs a signal indicative of the PC-scan selection to the USB control unit 113. When the selection signal of the PC-scanning function is received, the USB control unit 113 selects the scanner descriptor forming unit 11315 in the multi-descriptor forming unit 11313 and activates the scanner descriptor forming unit 11315.

When the selecting instruction is made by the keys 1142 of the operation panel 114 or the PC-scanner key 1143 is pressed, information indicative of the key depression (selection signal and reset signal) is transmitted from the operation panel 114 to the key event delivery unit 122. The key event delivery unit 122 which received the information transfers the information to the device control unit 1131 in the USB control unit 113. The device control unit 1131 which received the information executes the bus resetting in the USB-connection by the resetting unit 11314 and forms the device descriptor by the multi-descriptor forming unit 11313. When the bus resetting is executed, the communication between the PC 30 and the scanner apparatus 10 is started by the control transfer. The formed device descriptor is notified to the PC 30.

In the control transfer, when an obtaining command of the device descriptor is issued from the PC 30 to the scanner apparatus 10, the device descriptor formed by the scanner apparatus 10 is sent from the scanner apparatus 10 to the PC 30. On the basis of the obtained device descriptor, the PC 30 allocates an address for accessing the scanner apparatus 10 to the scanner and makes the device definition. After that, the PC 30 communicates with the scanner apparatus 10 by using the set address.

The device descriptor is divided into a plurality of parts and transmitted from the scanner apparatus 10 to the PC 30. First, main information of the device descriptor is transmitted from the scanner apparatus 10 to the PC 30. After that, the PC 30 issues an obtaining request of detailed information of the device descriptor to the scanner apparatus 10. The scanner apparatus 10 which received the request outputs the necessary detailed information to the PC 30. Information regarding resources of the scanner apparatus 10, for example, information such as using method of the pipe, ID (identification) code, and the like is included in the necessary detailed information. For example, the PC 30 searches for the device driver with reference to the ID code and activates the corresponding driver. When the setup of the scanner apparatus 10 is completed in this manner, the scanner apparatus 10 can provide the functions described in the device descriptor.

When the scanner apparatus 10 is hot plug-in connected to the PC 30, the PC 30 detects the connection of the scanner apparatus 10 and, thereafter, executes the bus resetting. Since the operation after the bus resetting is similar to that of the contents mentioned above, its description is omitted here.

Figure 7:
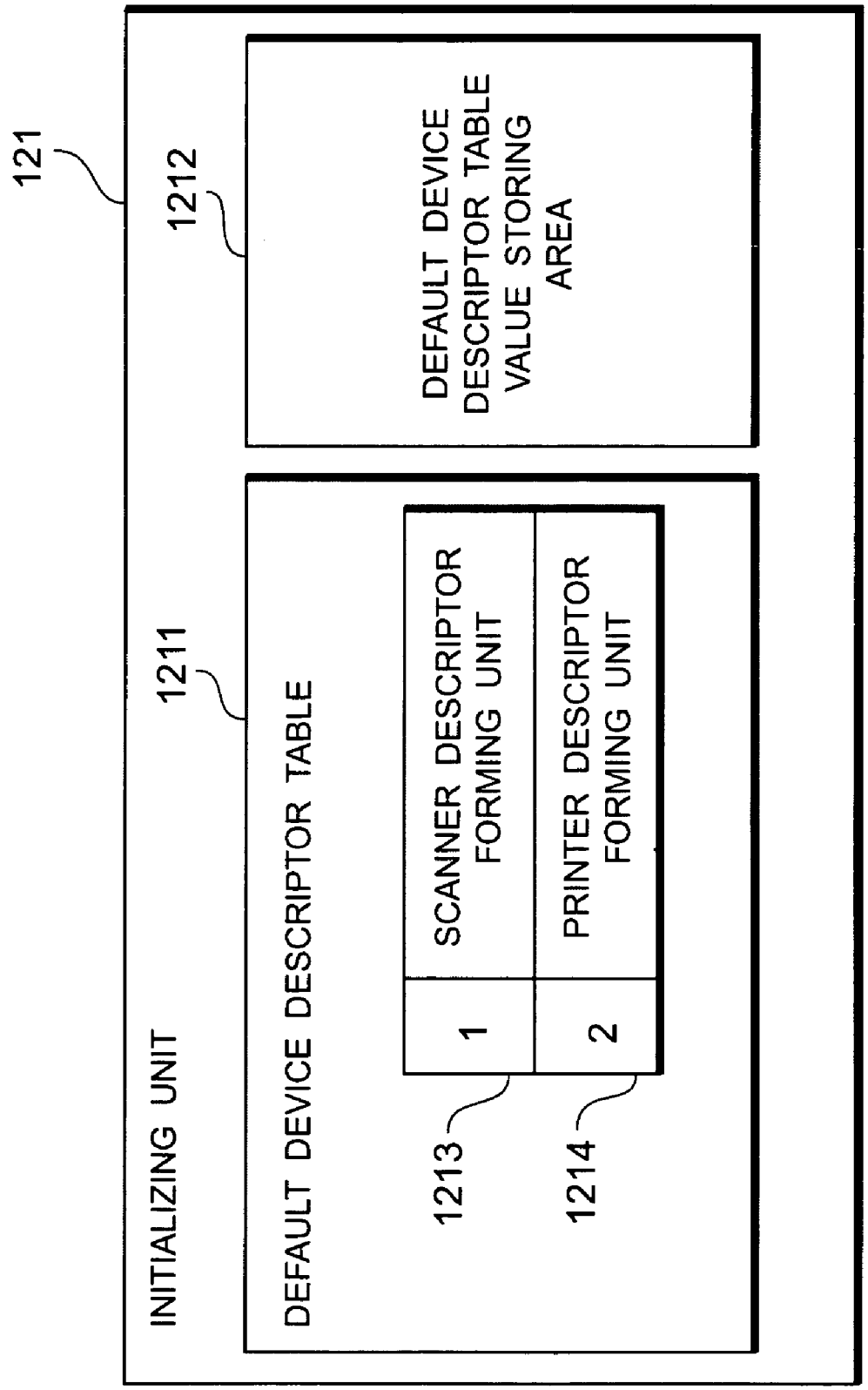
FIG. 7 is a constructional diagram of an initializing unit.

The initializing unit 121 of the scanner apparatus 10 has a function for arbitrarily notifying the PC 30 of the device descriptor upon initialization. Specifically speaking, as shown in FIG. 7, the initializing unit 121 has: a default device descriptor table 1211 in which the forming unit of the device descriptor (the scanner descriptor forming unit 11315 or the printer descriptor forming unit 11316) is made to correspond to a table number; and a default device descriptor table value storing area 1212 in which the table numbers to refer to the table upon initialization have been stored.

A corresponding table 1213 in which the scanner descriptor forming unit 11315 is made to correspond to the table No. 1; and a corresponding table 1214 in which the printer descriptor forming unit 11316 is made to correspond to the table No. 2 are shown in the default device descriptor table 1211.

An arbitrary table number has been stored in the default device descriptor table value storing area 1212. The forming unit of the device descriptor to be notified to the PC 30 upon initialization is selected in accordance with the table number shown in the default device descriptor table value storing area 1212.

Figure 8:
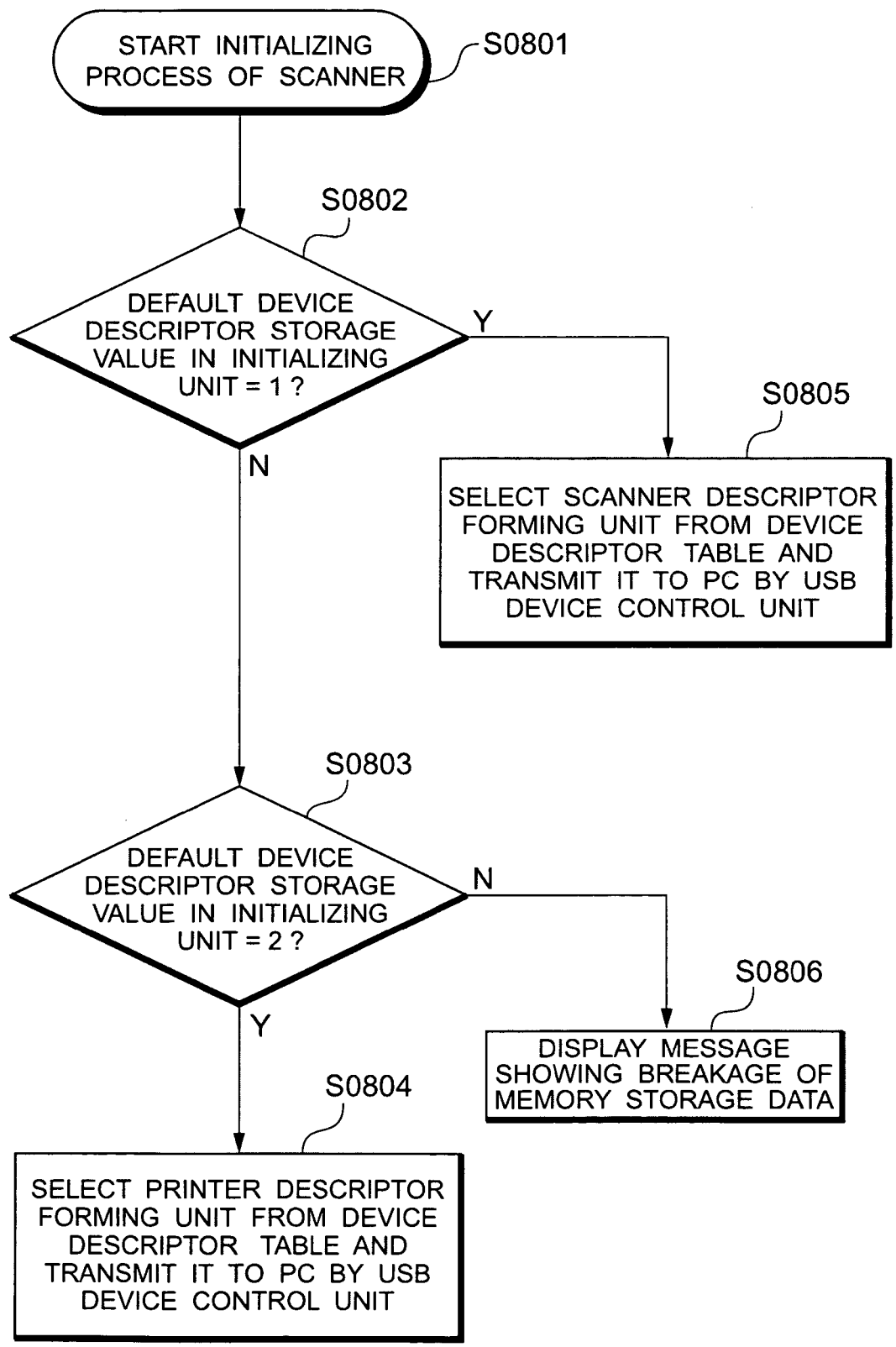
FIG. 8 is a flowchart showing the initializing operation in the embodiment 1.

The initializing operation of the scanner apparatus 10 will now be described with reference to a flowchart of FIG. 8.

First, when the initializing process of the scanner apparatus is started by the initializing unit 121 (step S0801), the value in the default device descriptor table value storing area 1212 is discriminated (S0802). If it is equal to "1", the activation of the scanner descriptor forming unit 11315 is selected by the default device descriptor table 1211. Thus, the device descriptor in which the scanner function information is shown is formed by the scanner descriptor forming unit 11315. After that, the scanner descriptor is transmitted to the PC 30 by the device control unit 1131 in the USB control unit 113 (S0805).

When the value in the default device descriptor table value storing area 1212 is equal to "2" (S0803), the activation of the printer descriptor forming unit 11316 is selected by the default device descriptor table 1211. The device descriptor in which the printer function information is shown is formed by the printer descriptor forming unit 11316. After that, the printer descriptor is transmitted to the PC 30 by the device control unit 1131 in the USB control unit 113 (S0804).

When the value in the default device descriptor table value storing area 1212 is not equal to "2", it is regarded that the value in the default device descriptor table value storing area 1212 is illegal, and a message showing that the memory storage data has been broken is displayed on an LCD display of the operation panel 114 (S0806).

Figure 9:
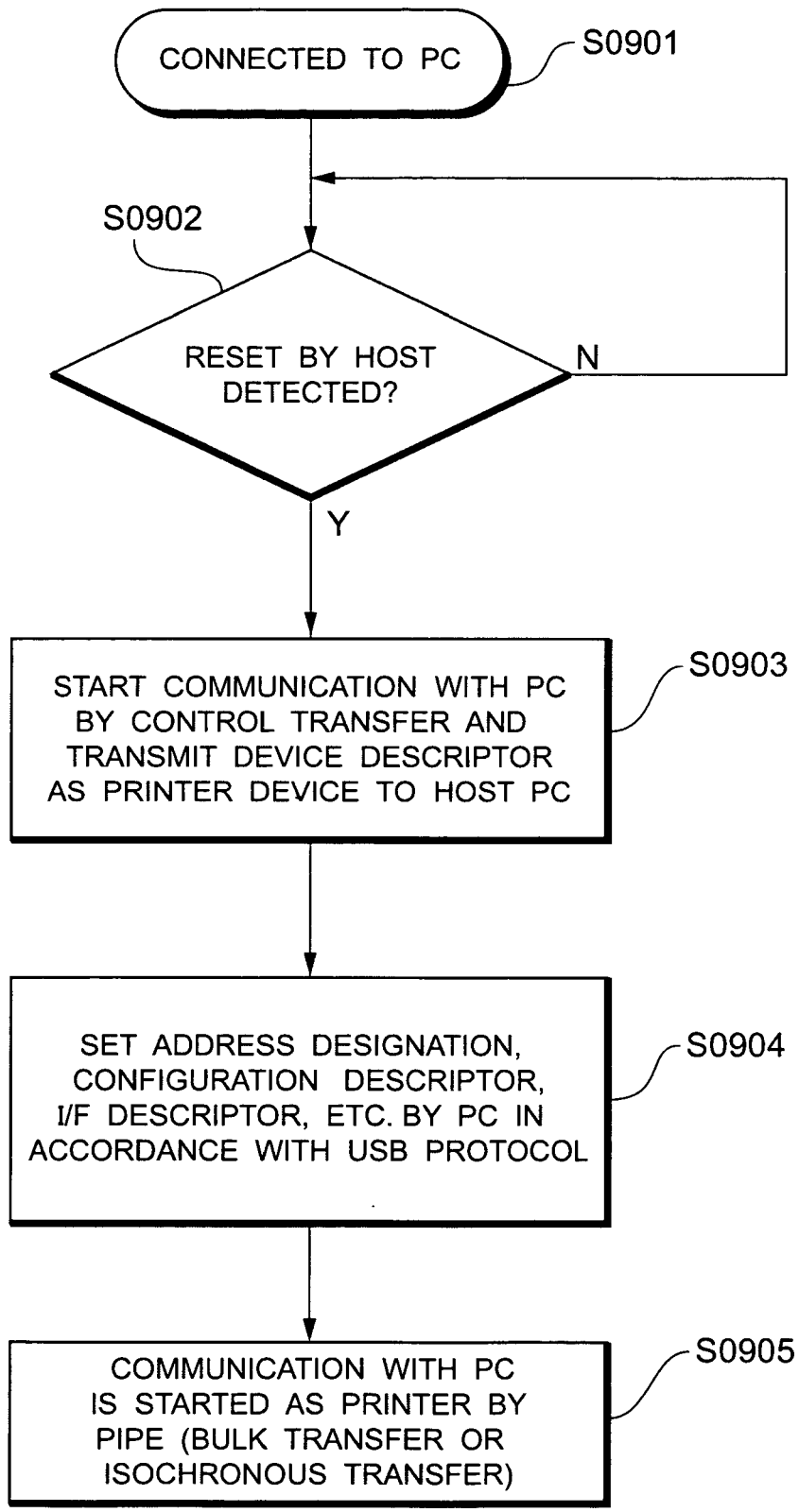
FIG. 9 is a flowchart showing the operation at the time of hot plug-in connection in the embodiment 1.

The operation when the scanner apparatus 10 to which the printer apparatus 20 has been connected is connected to the PC 30 by the hot plug-in will now be described with reference to a flowchart of FIG. 9.

When the scanner apparatus 10 is connected to the PC 30 by the hot plug-in (S0901), the PC 30 recognizes the connection of the new device and executes the bus resetting of the USB. When the resetting from the PC 30 is detected (S0902), the scanner apparatus 10 activates the printer descriptor forming unit 11316. The printer descriptor is formed by the printer descriptor forming unit 11316.

The formed printer descriptor is transmitted from the scanner apparatus 10 to the PC 30 (S0903). The PC 30 which obtained the printer descriptor executes address designation and sets a configuration descriptor, an interface descriptor, and the like in accordance with a USB protocol (S0904). A pipe for a bulk transfer or isochronous transfer is established and the scanner apparatus 10 starts the USB-communication with the PC 30 as a printer by the pipe (S0905).

Figure 10:
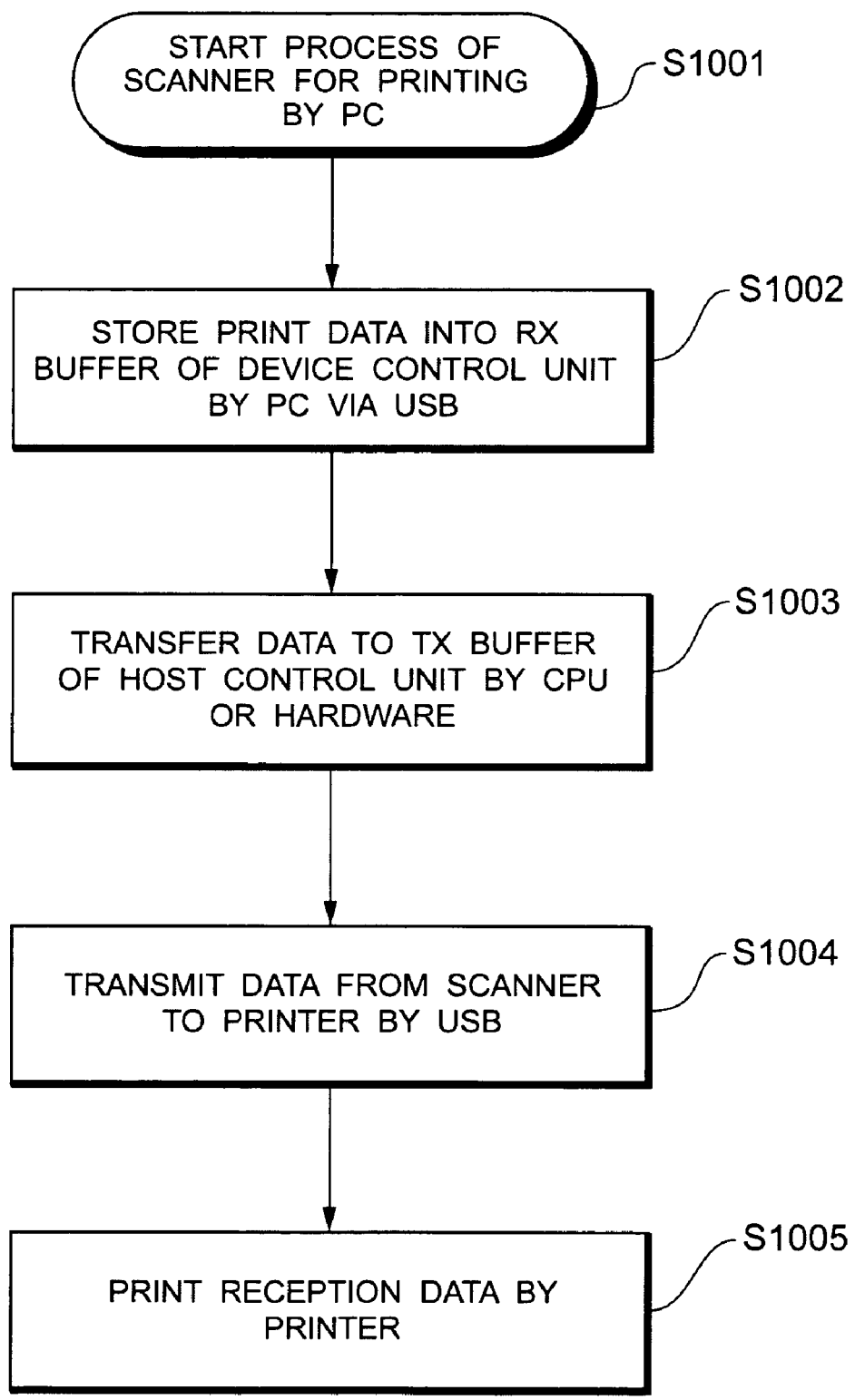
FIG. 10 is a flowchart showing the operation at the time of PC printing in the embodiment 1.

The printing operation which is executed by the printer apparatus 20 on the basis of the data formed by the PC 30 will now be described with reference to a flowchart of FIG. 10. Explanation will be made on the assumption that the operator issues an instruction to control the printer apparatus 20 by the PC 30 by the operation panel 114, the device descriptor in which the printer function information is shown is formed and notified to the PC 30, and the device definition is made by the PC 30.

By a printer driver installed in the PC 30, an image process is executed to the formed data, a compressing process is executed thereto, and the compressed data is converted into a printer language, thereby forming print data. The print data is transmitted from the PC 30 to the scanner apparatus 10 through the USB cable 41. When the USB control unit 113 of the scanner apparatus 10 receives the print data (S1001), the print data is stored into the Rx buffer 11311 of the device control unit 1131 (S1002).

The data stored in the Rx buffer 11311 of the device control unit 1131 is transferred to the Tx buffer 11321 of the host control unit 1132 by the CPU or hardware (S1003). Subsequently, the print data stored in the Tx buffer 11321 of the host control unit 1132 of the USB control unit 113 is transmitted to the printer apparatus 20 by the control of a host controller of the PC 30 (S1004). The printer apparatus 20 executes the printing process on the basis of the received print data (S1005).

Figure 11:
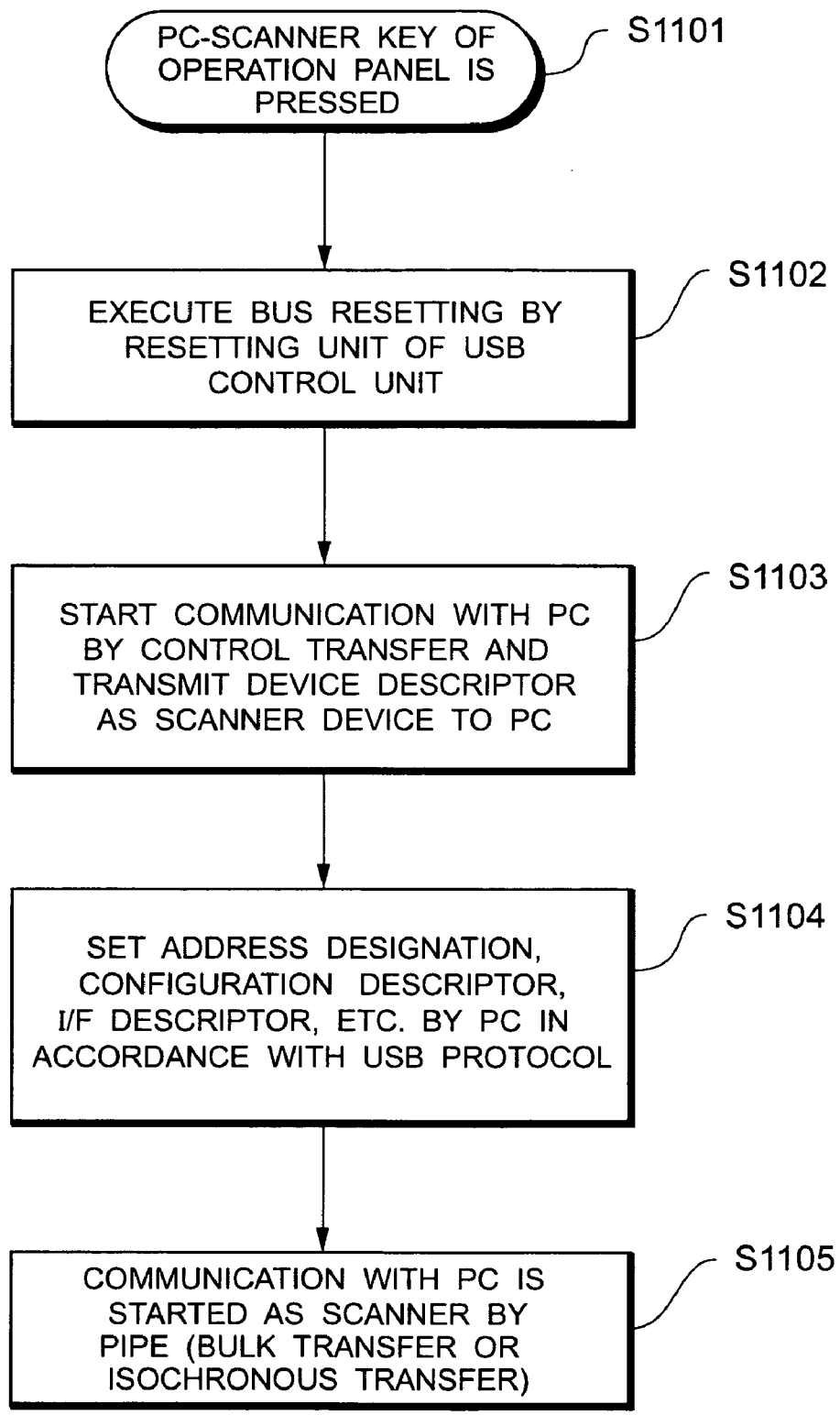
FIG. 11 is a flowchart showing the operation at the time of PC scan in the embodiment 1.

The operation in the case of using the scanner apparatus 10 as a PC-scanner function will now be described with reference to a flowchart of FIG. 11. When the operator presses the PC-scanner key 1143 on the operation panel 114 (S1101), information indicative of the depression of the PC-scanner key 1143 is transmitted to the USB control unit 113 by the key event delivery unit 122, so that the scanner descriptor forming unit 11315 is selected by the USB control unit 113. The selected scanner descriptor forming unit 11315 forms the scanner descriptor.

After that, when the bus resetting is executed by the resetting unit 11314 of the USB control unit 113 (S1102), the scanner apparatus 10 starts the communication with the PC 30 by the control transfer (that is, the USB control unit 113 transmits the scanner descriptor to the PC 30) (S1103). On the basis of the scanner descriptor, the PC 30 obtains information called address designation, configuration descriptor, and interface descriptor and makes various settings (S1104). By the settings, a transmission path called a pipe for the bulk transfer or isochronous transfer is determined and the PC starts the USB-communication with the scanner apparatus 10 (S1105).

According to the scanner apparatus 10 in the embodiment 1, only one function information whose selection has been instructed is read out so as to make the USB-communication by the function whose selection has been instructed by the operator by the operation panel 114 and when the device descriptor in which only the function information is shown is formed, the PC 30 is notified of the device descriptor after the bus resetting. Thus, the PC 30 can specify the communication partner destination on the basis of the single function information shown in the notified device descriptor, make the device definition of the specified communication partner destination, and make the USB-communication.

Therefore, according to the scanner apparatus 10 in the embodiment 1, by notifying the PC 30 of the device descriptor in which only one function information is shown, the communication partner destination can be specified on the basis of the single function information shown in the device descriptor. The dedicated driver to select the function and issue a switching command of the connecting construction (vendor request) is unnecessary. Thus, there is no need to develop the dedicated driver and, naturally, the troublesomeness to install the dedicated driver into the PC 30 can be eliminated.

According to the scanner apparatus 10 in the embodiment 1, there is no need to provide a special IC chip for setting an end point into each of the scanner apparatus 10 and the printer apparatus 20 and an increase in manufacturing costs of the scanner apparatus 10 and the printer apparatus 20 can be suppressed.

Further, by the initializing unit 121 for fixing so as to always select the device descriptor for the printer (or scanner) and setting so as to transmit the device descriptor for the printer (or scanner) to the PC 30, when the power source is turned on, the scanner apparatus 10 can be fixed to the PC-printer function (or PC-scanner function) and used. The user can use the function which has been set to a default without being aware of the setting of use of the scanner apparatus 10.

When the scanner apparatus 10 is connected to the PC 30 by hot plug-in, by fixing so as to always form the device descriptor for the printer (or scanner) and transmitting the device descriptor for the printer (or scanner) to the PC 30, at the time of hot plug-in, the scanner apparatus can be fixed to the PC-printer function (or PC-scanner function) and used. Therefore, the scanner apparatus 10 can be used without confusing the operator.

In the case of setting the scanner apparatus so as to operate as a PC-printer function at the time of initialization, power-on, or hot plug-in connection as well, by pressing the PC-scanner key 1143 on the operation panel 114, the scanner apparatus can be used by switching from the PC-printer function to the PC-scanner function. The use efficiency of the operator can be improved.

[Embodiment 2]

Since a system construction of the embodiment 2 is similar to that of the embodiment 1 shown in FIG. 1, its explanation is omitted here.

Figure 12:
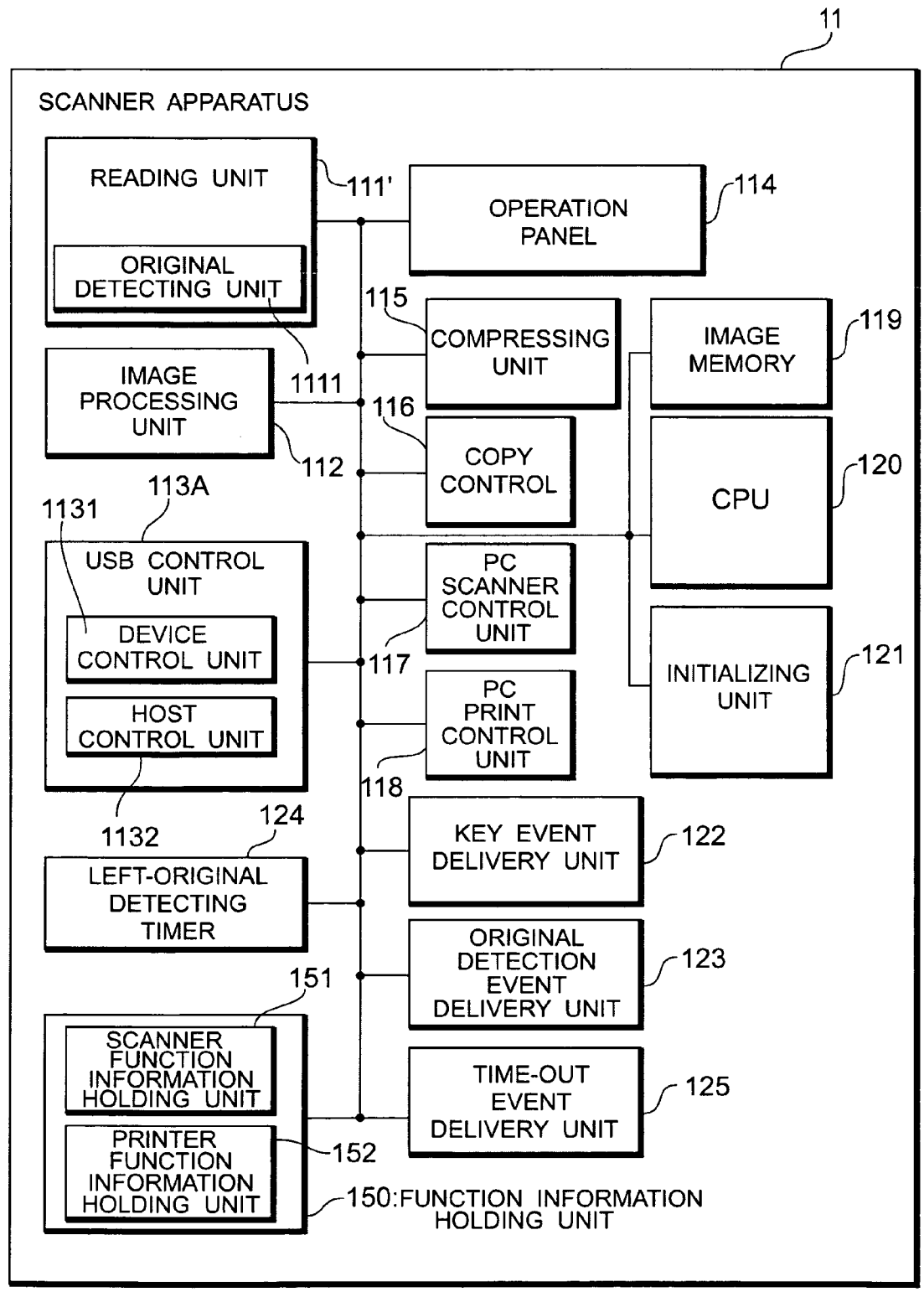
FIG. 12 is a constructional diagram of a scanner apparatus in the embodiment 2.

As shown in FIG. 12, according to a scanner apparatus 11 in the embodiment 2, the functions of the construction of the scanner apparatus 10 in the embodiment 1 are changed and new functions are added. Specifically speaking, the construction of the scanner apparatus 11 in the embodiment 2 differs from that of the embodiment 1 with respect to the following component elements: a reading unit 111' for reading the original; a USB control unit 113A; an original detection event delivery unit 123 for, when it is detected that the original has been put in the reading unit, transmitting information indicative of the detection to the device control unit 1131 of the USB control unit 113A; a left-original detecting timer 124 for detecting that the state where the original has been put in the reading unit continued for a predetermined time or more; and a time-out event delivery unit 125 for, when a time-out signal is received from the left-original detecting timer 124, transmitting information indicative of the detection of the left-original to the device control unit 1131 of the USB control unit 113A.

The reading unit 111' has an original detecting unit 1111 for detecting that the original has been put. The original detecting unit 1111 transmits an original detection signal indicating that the original has been put to the original detection event delivery unit 123 and the left-original detecting timer 124.

The original detection event delivery unit 123 which received the original detection signal transmits the information indicative of the detection of the original to the USB control unit 113A. When the information indicative of the detection of the original is received, the USB control unit 113A selects the scanner descriptor forming unit 11315 and transmits the scanner descriptor formed in the scanner descriptor forming unit 11315 to the PC 30.

When the original detection signal is received, the left-original detecting timer 124 starts the time counting operation. When it is detected that the state where the original has been put in the reading unit continued for a predetermined time or more, the timer 124 transmits the time-out signal to the time-out event delivery unit 125. The time-out event delivery unit 125 which received the time-out signal transmits the information indicative of the detection of the left-original to the device control unit 1131 of the USB control unit 113A. When the information indicative of the detection of the left-original is received, the left-original to the device control unit 1131 of the USB control unit 113A selects the printer descriptor forming unit 11316 and transmits the printer descriptor formed by the printer descriptor forming unit 11316 to the PC 30.

Figure 13:
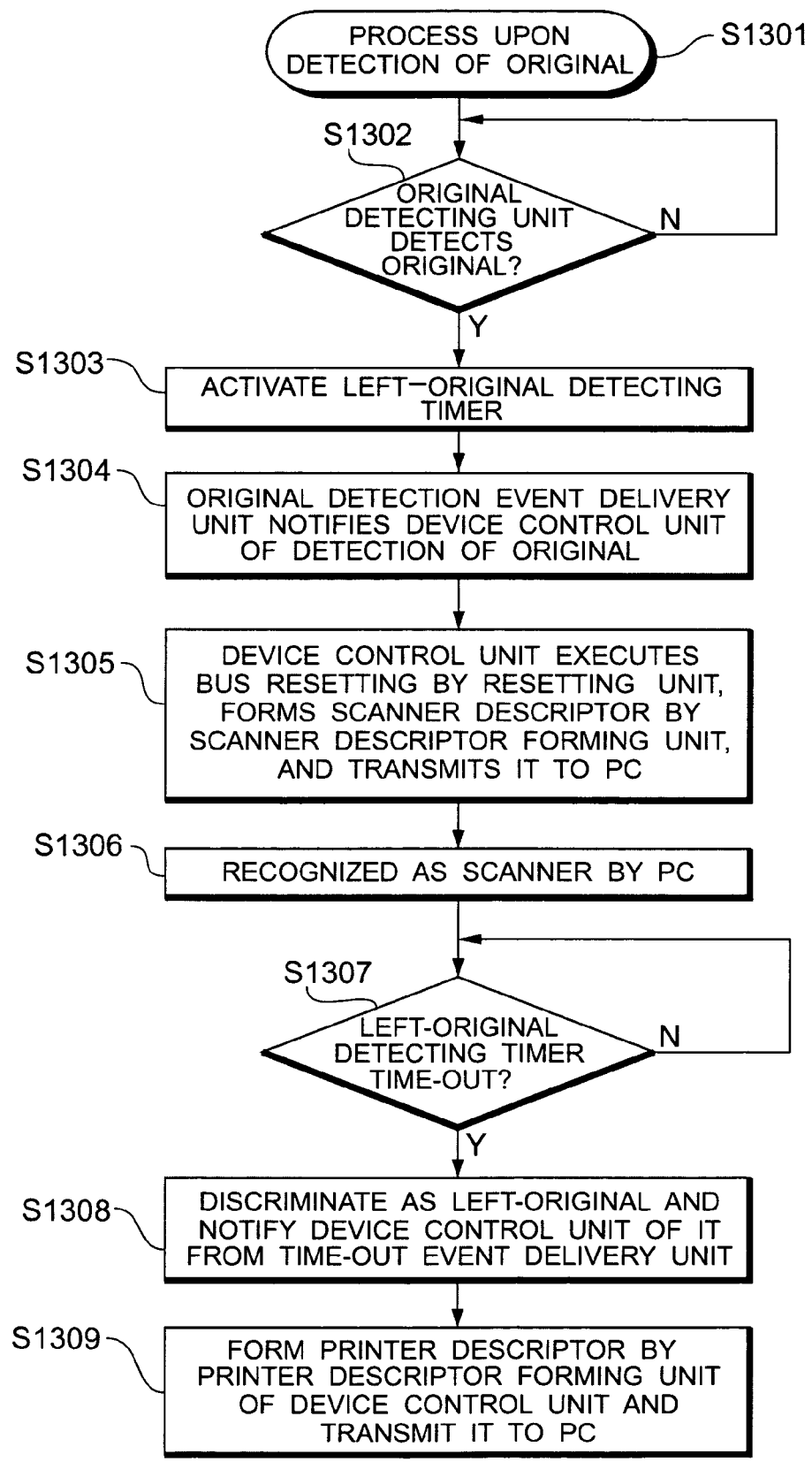
FIG. 13 is a flowchart showing the operation at the time of detection of an original in the embodiment 2.

The operation of the scanner apparatus 11 in the embodiment 2 will now be described with reference to a flowchart of FIG. 13.

When the original is put in the reading unit 111' of the scanner apparatus 11 to use the scanner function by the operator, the original detecting unit 1111 detects that the original has been put (S1302) and outputs the original detection signal to the original detection event delivery unit 123 and the left-original detecting timer 124. The left-original detecting timer 124 which received the original detection signal starts the time counting operation (S1303).

The original detection event delivery unit 123 which received the original detection signal transmits the information indicative of the detection of the original to the device control unit 1131 of the USB control unit 113A (S1304). The device control unit 1131 which received the information indicative of the detection of the original selects the scanner descriptor forming unit 11315 and executes the bus resetting so as to transmit the scanner descriptor formed by the scanner descriptor forming unit 11315 to the PC 30. By the control transfer after the bus resetting, the scanner descriptor is sent from the scanner apparatus 11 to the PC 30 (S1305).

The PC 30 makes the device definition on the basis of the obtained scanner descriptor. Thus, the PC 30 can recognize that the scanner apparatus 11 operates by the scanner function (S1306).

When the PC scan is not executed by the instruction of the operator in spite of the fact that the original has been put in the reading unit 111', if a time interval of, for example, 5 minutes has been set as a left-original detecting time, the left-original detecting timer 124 times out after the elapse of 5 minutes and outputs the time-out signal to the time-out event delivery unit 125 (S1307).

The time-out event delivery unit 125 which received the time-out signal outputs the information indicative of the detection of the left-original to the USB control unit 113A (S1308). The device control unit 1131 of the USB control unit 113A which received the information indicative of the detection of the left-original selects the printer descriptor forming unit 11316 by the multi-descriptor forming unit 11313 and transmits the printer descriptor formed by the printer descriptor forming unit 11316 to the PC 30 by the control transfer after the bus resetting (S1309).

The PC 30 makes the device definition on the basis of the obtained printer descriptor. Thus, the PC 30 can make the printer apparatus 20 operative through the scanner apparatus 11.

According to the scanner apparatus 11 in the embodiment 2, the original detecting unit 1111 is provided for the reading unit 111' and, when it is detected that the original has been left, the USB control unit 113A selects the scanner descriptor forming unit 11315 and transmits the scanner descriptor formed by the scanner descriptor forming unit 11315 to the PC 30, so that the PC 30 can make the device definition on the basis of the scanner descriptor. Thus, merely by putting the original onto the scanner apparatus 11, the PC-scanner function can be used and the use efficiency of the operator can be improved.

When the left-original detecting timer 124 detects the left-original, the function of the scanner apparatus 11 is switched to the PC-printer function. Therefore, when the original is left without reading the original by the reading unit 111', the operator can use the scanner apparatus 11 as a PC-printer function.

[Embodiment 3]

Since a system construction of the embodiment 3 is similar to that of the embodiment 1 shown in FIG. 1, its explanation is omitted here.

Figure 14:
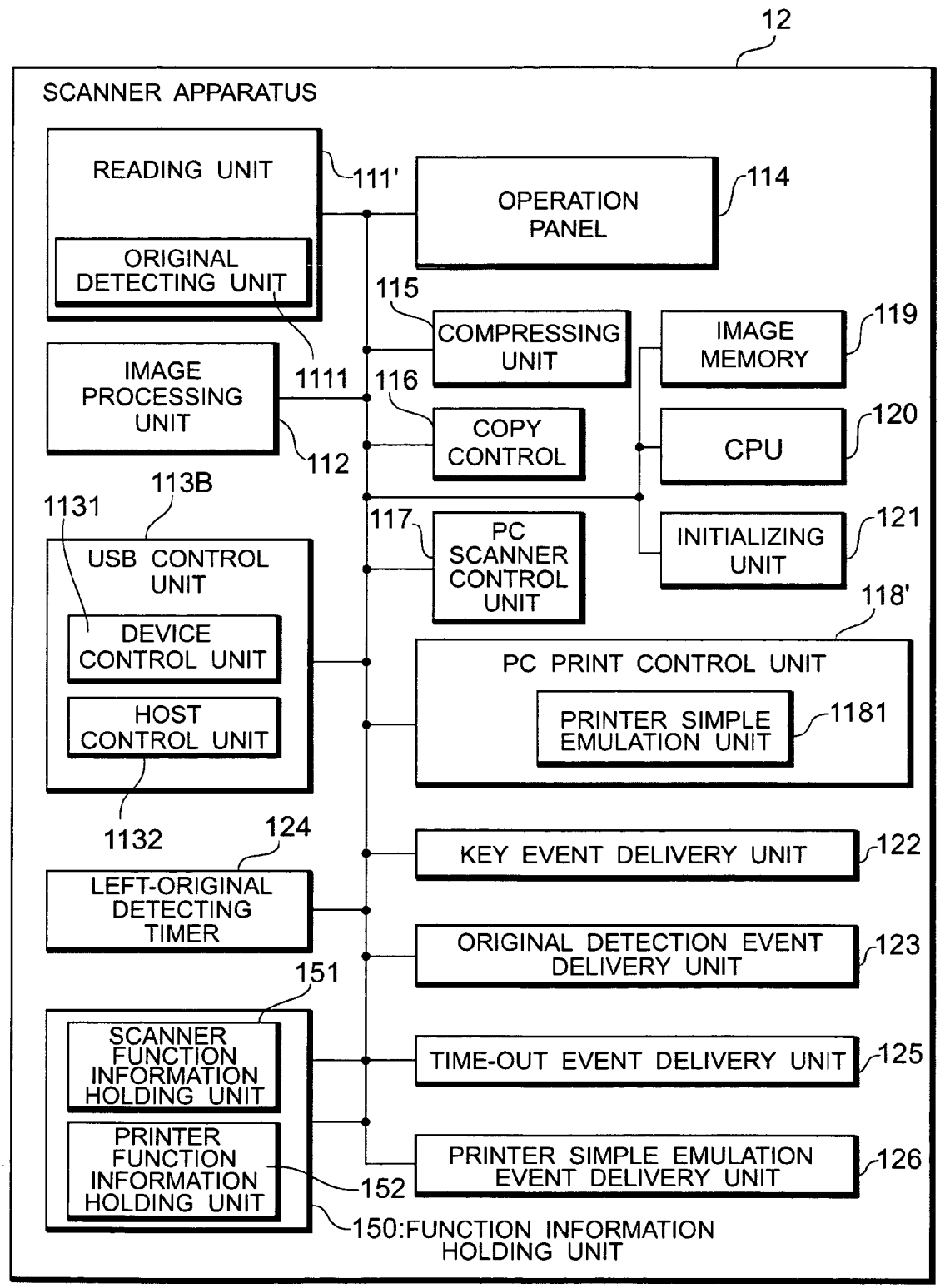
FIG. 14 is a constructional diagram of a scanner apparatus in the embodiment 3.

As shown in FIG. 14, according to a scanner apparatus 12 in the embodiment 3, the following component elements are added to the construction of the scanner apparatus 11 in the embodiment 2: a USB control unit 113B in place of the USB control unit 113A; a PC print control unit 118' for making control for the PC printer; and a printer simple emulation event delivery unit 126 for transmitting information indicative of detection of a command to switch the device descriptor from the printer descriptor to the scanner descriptor to the USB control unit 113B.

The PC print control unit 118' has a printer simple emulation unit (specific information extracting unit) 1181 for analyzing the printer language sent from the PC 30 and detecting the "command to switch the device descriptor from the printer descriptor to the scanner descriptor" (specific information). When the "command to switch the device descriptor from the printer descriptor to the scanner descriptor" cannot be detected in the printer simple emulation unit (specific information extracting unit) 1181, the ordinary PC-printer function is executed.

When a detection signal indicative of the detection of the "command to switch the device descriptor from the printer descriptor to the scanner descriptor" is received from the printer simple emulation unit 1181, the printer simple emulation event delivery unit 126 transmits information indicative of the "command to switch the device descriptor" to the USB control unit 113B.

Figure 15:
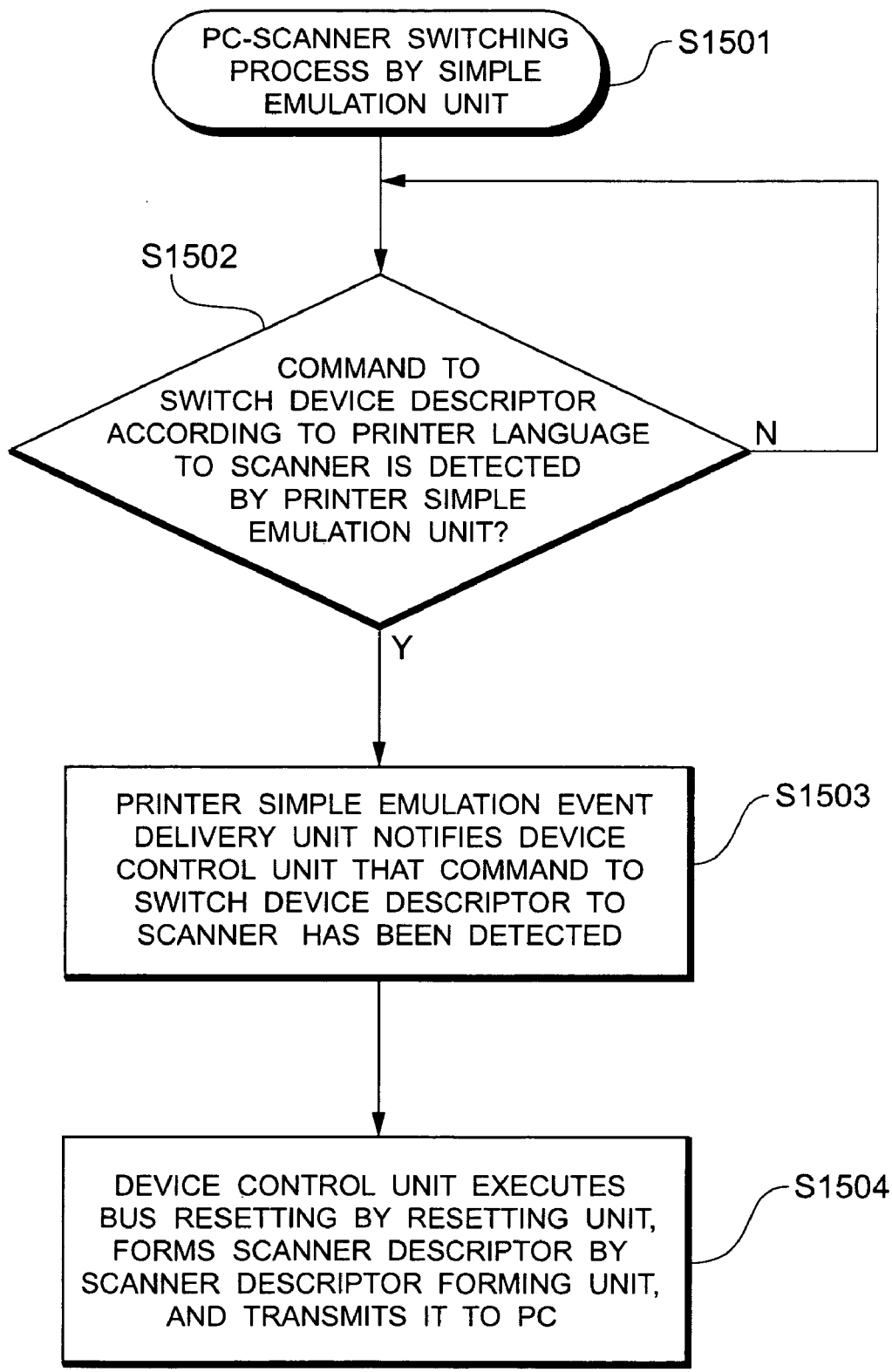
FIG. 15 is a flowchart showing a flow of the operation in the embodiment 3.

The operation of the scanner apparatus 12 in the embodiment 3 will now be described with reference to a flowchart of FIG. 15.

When the operator of the PC 30 issues an instruction to stop the PC-printer function from the PC 30 in order to use the scanner function, the printer driver transmits the command to switch the device descriptor from the printer descriptor to the scanner descriptor to the scanner apparatus 12 (S1501). When the scanner apparatus 12 which received the command detects the "command to switch the device descriptor from the printer descriptor to the scanner descriptor" in the printer simple emulation unit 1181 of the PC print control unit 118' (S1502), the printer simple emulation event delivery unit 126 is notified of the detection.

The printer simple emulation event delivery unit 126 which received the notification outputs information indicative of the detection of the "command to switch the device descriptor from the printer descriptor to the scanner descriptor" to the USB control unit 113B (S1503). The device control unit 1131 of the USB control unit 113B which received the information selects the scanner descriptor forming unit 11315 by the multi-descriptor forming unit 11313 and transmits the scanner descriptor formed by the scanner descriptor forming unit 11315 to the PC 30 by the control transfer after the bus resetting (S1504). The PC 30 makes the device definition on the basis of the obtained scanner descriptor. Thus, the PC 30 recognizes the scanner apparatus 12 as a scanner function and the PC-scanner function is validated.

According to the scanner apparatus 12 in the embodiment 3, when the printer language is analyzed by the printer simple emulation unit 1181 and the "command to switch the device descriptor from the printer descriptor to the scanner descriptor" is detected, by switching the device descriptor to the printer descriptor and notifying the PC 30 of the scanner descriptor, the PC 30 makes the device definition on the basis of the scanner descriptor and switches the connecting construction. Thus, by switching the apparatus from the PC-printer function to the PC-scanner function by the operation from the PC 30, the apparatus can be used as a PC-scanner function and the use efficiency of the operator can be improved.

[Embodiment 4]

Since a system construction of the embodiment 4 is similar to that of the embodiment 1 shown in FIG. 1, its explanation is omitted here.

Although the "command to switch the device descriptor from the printer descriptor to the scanner descriptor" is detected in the scanner apparatus 12 in the embodiment 3, a scanner apparatus 13 in the embodiment 4 differs from the scanner apparatus 12 in the embodiment 3 with respect to a point that a "command to switch the device descriptor from the scanner descriptor to the printer descriptor" is detected.

Figure 16:
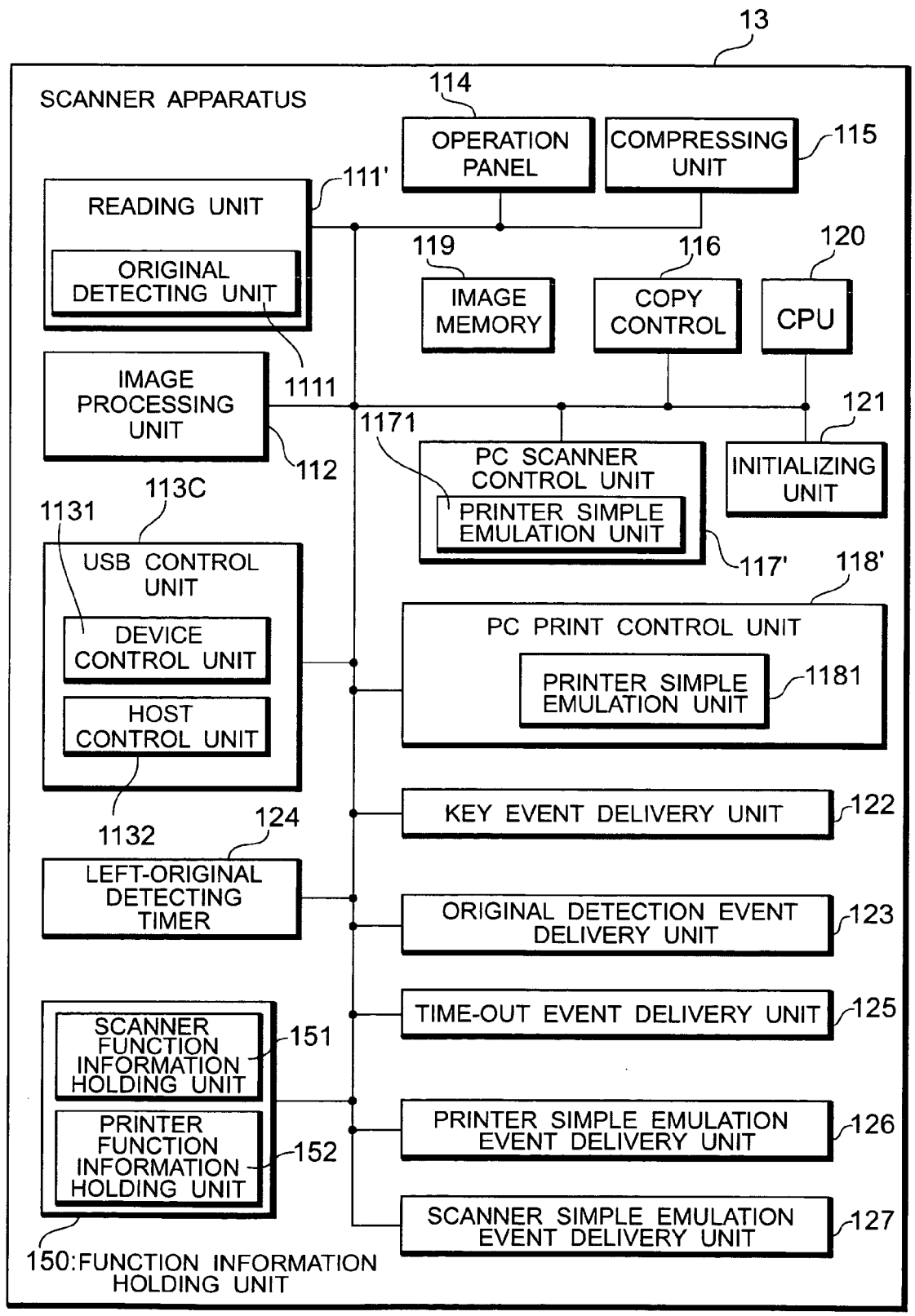
FIG. 16 is a constructional diagram of a scanner apparatus in the embodiment 4.

As shown in FIG. 16, according to the scanner apparatus 13 in the embodiment 4, the following component elements are added to the construction of the scanner apparatus 12 in the embodiment 3: a USB control unit 113C in place of the USB control unit 113B; a PC scanner control unit 117' for making control for the PC printer; and a scanner simple emulation event delivery unit 127 for transmitting information indicative of detection of the command to switch the device descriptor from the scanner descriptor to the printer descriptor to the USB control unit 113C.

The PC scanner control unit 117' has a scanner simple emulation unit (specific information extracting unit) 1171 for analyzing the scanner language sent from the PC 30 and detecting the "command to switch the device descriptor from the scanner descriptor to the printer descriptor" (specific information). When the "command to switch the device descriptor from the scanner descriptor to the printer descriptor" cannot be detected in the scanner simple emulation unit (specific information extracting unit) 1171, the ordinary PC-scanner function is executed.

When a detection signal indicative of the detection of the "command to switch the device descriptor from the scanner descriptor to the printer descriptor" is received from the scanner simple emulation unit 1171, the scanner simple emulation event delivery unit 127 transmits information indicative of the "command to switch the device descriptor" to the USB control unit 113C.

Figure 17:
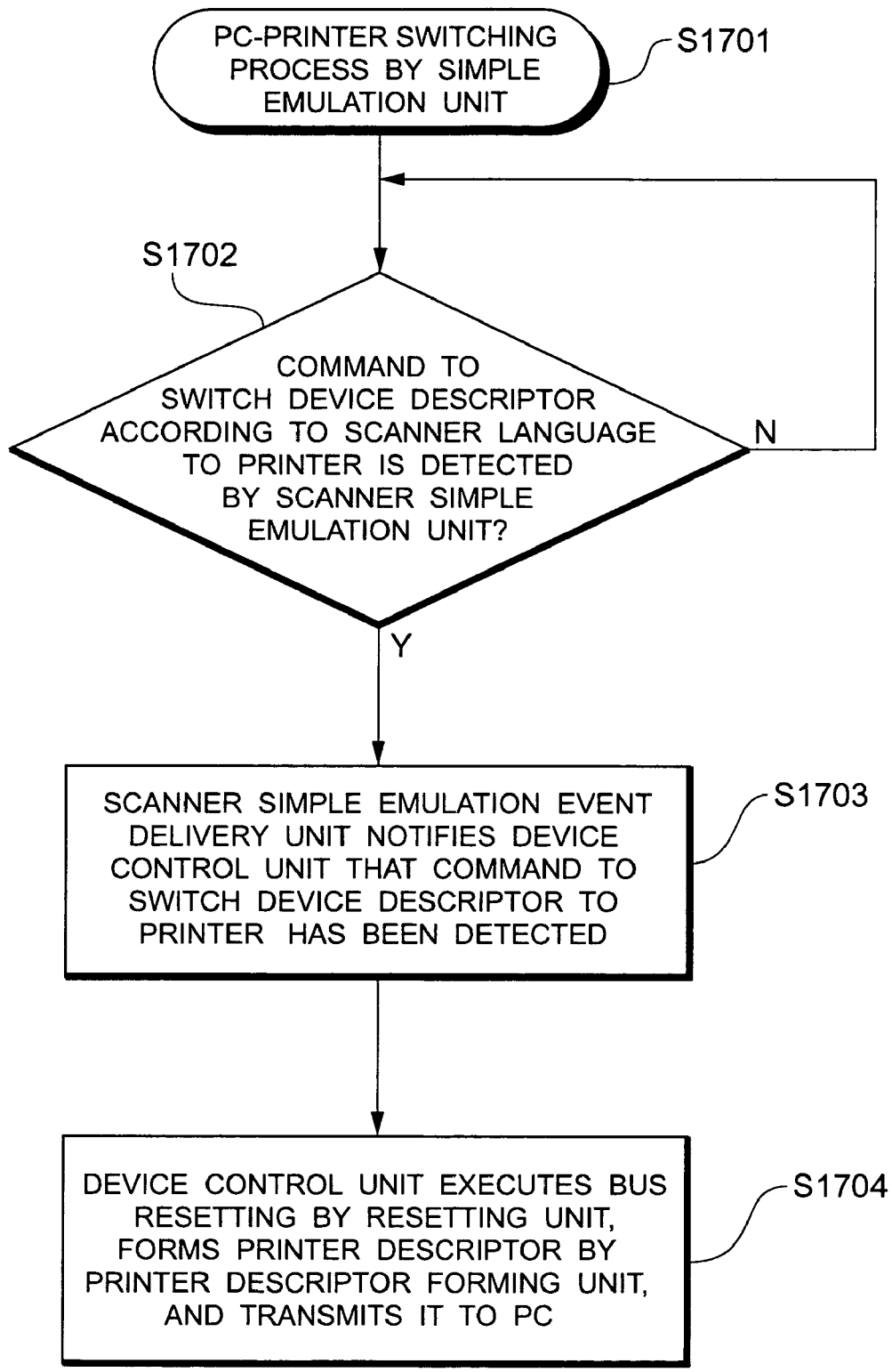
FIG. 17 is a flowchart showing a flow of the operation in the embodiment 4.

The operation of the scanner apparatus 13 in the embodiment 4 will now be described with reference to a flowchart of FIG. 17.

When the operator issues an instruction to stop the PC-scanner function from the PC 30 in order to use the printer function, the scanner driver transmits the command to switch the device descriptor from the scanner descriptor to the printer descriptor to the scanner apparatus 13 (S1701). When the scanner apparatus 13 which received the command detects the "command to switch the device descriptor from the scanner descriptor to the printer descriptor" in the scanner simple emulation unit 1171 of the PC scanner control unit 117' (S1702), the scanner simple emulation event delivery unit 127 is notified of the detection.

The scanner simple emulation event delivery unit 127 which received the notification outputs information indicative of the detection of the "command to switch the device descriptor from the scanner descriptor to the printer descriptor" to the USB control unit 113C (S1703). The device control unit 1131 of the USB control unit 113C which received the information selects the printer descriptor forming unit 11316 by the multi-descriptor forming unit 11313 and transmits the printer descriptor formed by the printer descriptor forming unit 11316 to the PC 30 by the control transfer after the bus resetting (S1704). The PC 30 makes the device definition on the basis of the obtained printer descriptor. Thus, the PC 30 can make USB-communication with the printer apparatus 20 through the scanner apparatus 12.

According to the scanner apparatus 13 in the embodiment 4, when the scanner language is analyzed by the scanner simple emulation unit 1171 and the "command to switch the device descriptor from the scanner descriptor to the printer descriptor" is detected, by switching the device descriptor to the scanner descriptor and notifying the PC 30 of the printer descriptor, the PC 30 makes the device definition on the basis of the printer descriptor and switches the connecting construction. Thus, by switching the apparatus from the PC-scanner function to the PC-printer function by the operation from the PC 30, the apparatus can be used as a PC-printer function and the use efficiency of the operator can be improved.

[Embodiment 5]

Since a system construction of the embodiment 5 is similar to that of the embodiment 1 shown in FIG. 1, its explanation is omitted here.

Figure 18:
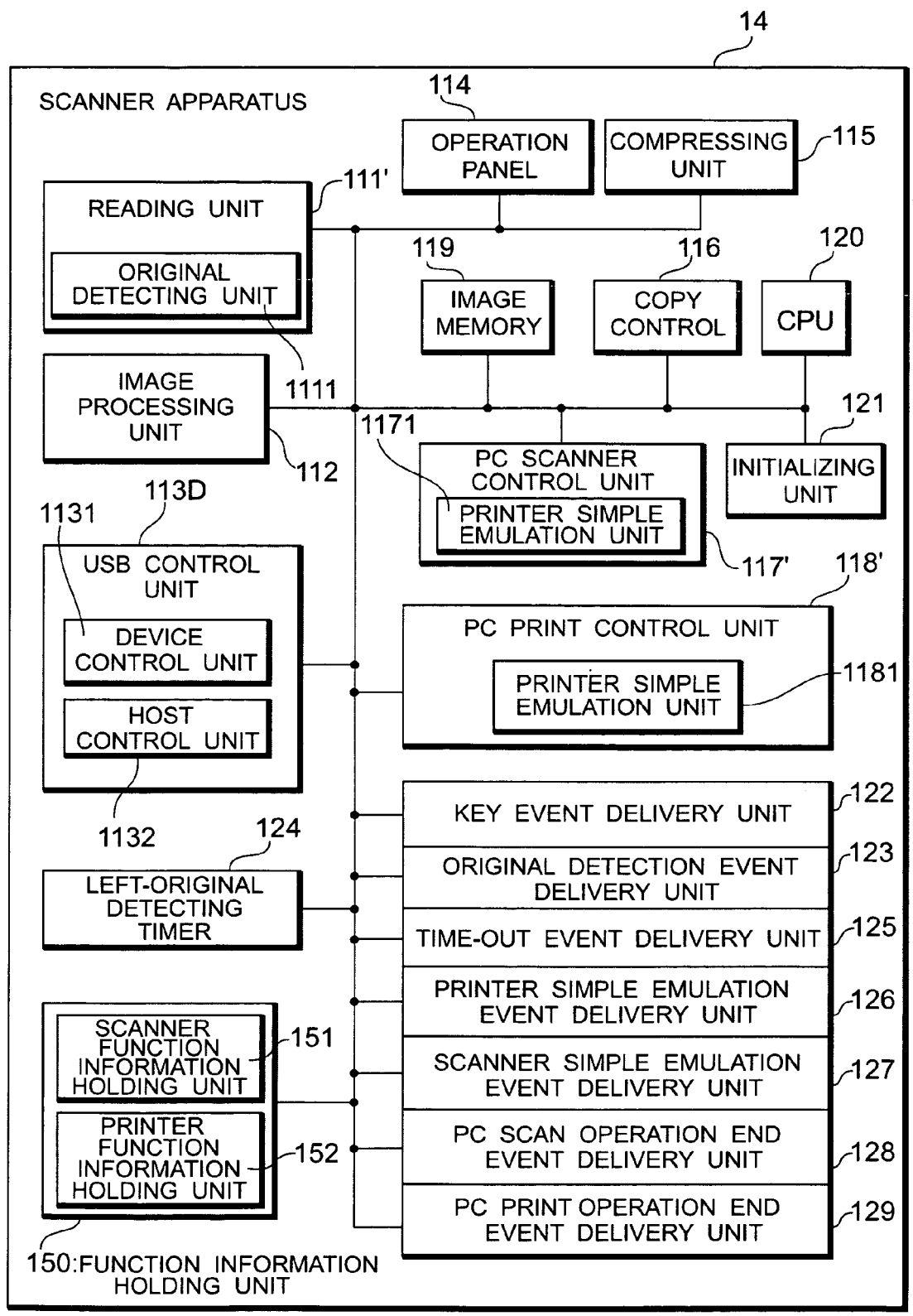
FIG. 18 is a constructional diagram of a scanner apparatus in the embodiment 5.

As shown in FIG. 18, according to a scanner apparatus 14 in the embodiment 5, the following component elements are added to the construction of the embodiment 4: a USB control unit 113D in place of the USB control unit 113C; a PC scan operation end event delivery unit 128 for transmitting information indicative of the end of the PC scanner function to the USB control unit 113D; and a PC print operation end event delivery unit 129 for transmitting information indicative of the end of the PC-printer function to the USB control unit 113D.

When the end of the PC scanning operation is detected by the reading unit 111', the PC scan operation end event delivery unit 128 transmits PC scan end information to the device control unit 1131 of the USB control unit 113D.

When it is detected that all of the print data stored in the Tx buffer 11321 of the host control unit 1132 of the scanner apparatus 14 has been transmitted to the printer apparatus 20, the PC print operation end event delivery unit 129 transmits the PC print end information to the device control unit 1131 of the USB control unit 113D.

When PC scan end information is received, the device control unit 1131 of the USB control unit 113D selects the printer descriptor forming unit 11316 by the multi-descriptor forming unit 11313 and transmits the printer descriptor formed by the printer descriptor forming unit 11316 to the PC 30. The device control unit 1131 which received the PC print end information selects the scanner descriptor forming unit 11315 by the multi-descriptor forming unit 11313 and transmits the scanner descriptor formed by the scanner descriptor forming unit 11315 to the PC 30.

The operation of the scanner apparatus 14 will now be described.

Figure 19:
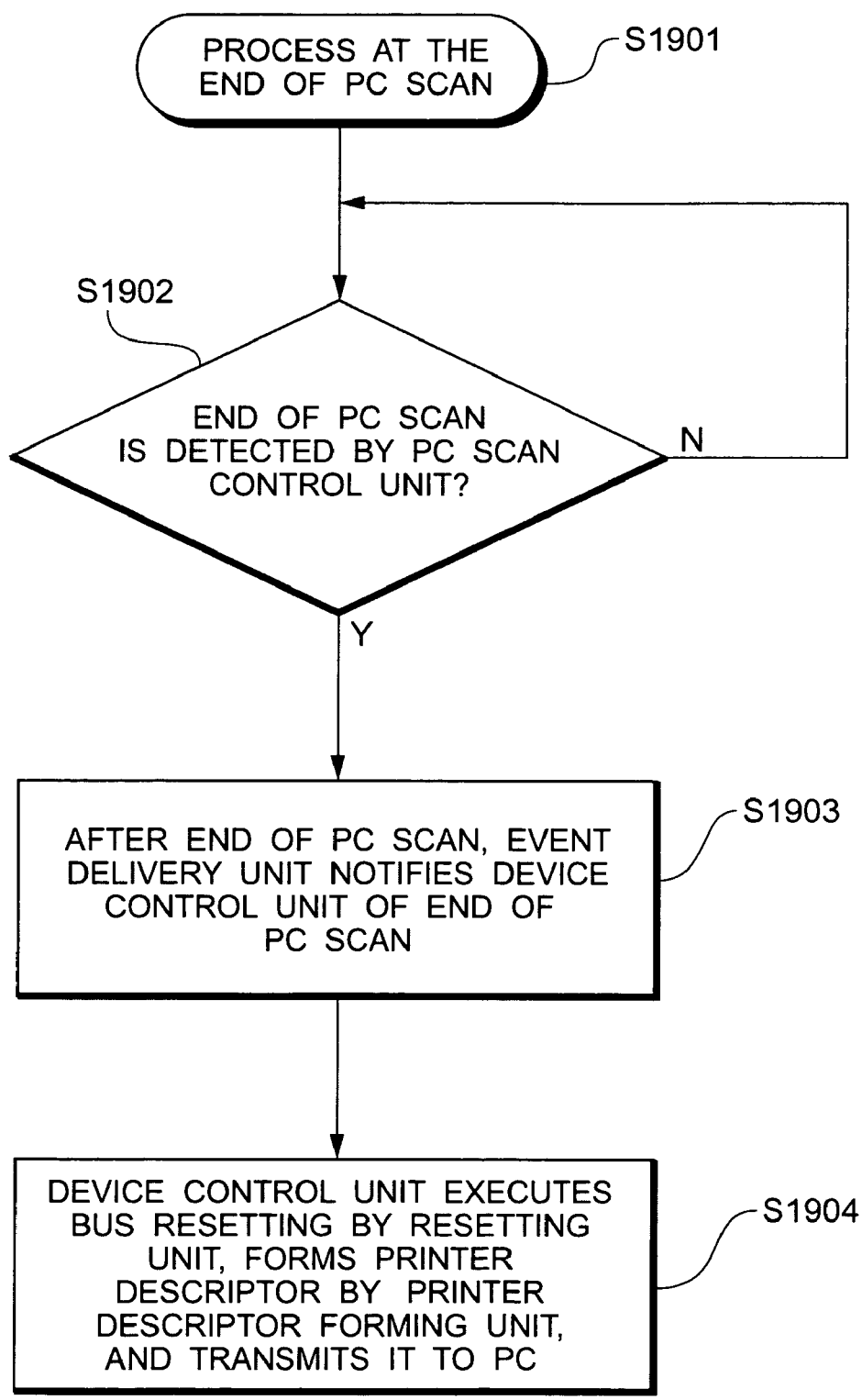
FIG. 19 is a flowchart showing the operation at the end of PC scan in the embodiment 5.

The operation when the PC-scanner function has been selected will be described with reference to a flowchart of FIG. 19.

The end of the PC scanning operation is monitored in the reading unit 111' (S1902). When the end of the PC scanning operation is detected by the reading unit 111', the PC scan operation end event delivery unit 128 is notified of the PC scan end information. The PC scan operation end event delivery unit 128 transmits information indicative of the end of the PC scanning operation to the USB control unit 113D (S1903).

The device control unit 1131 of the USB control unit 113D which received the PC scanning operation end information selects the printer descriptor forming unit 11316 from the two descriptor forming units by the multi-descriptor forming unit 11313 and transmits the printer descriptor formed by the selected printer descriptor forming unit 11316 to the PC 30 by the control transfer after the bus resetting was executed (S1904). Since the subsequent operation is similar to the contents described in the foregoing embodiment, its explanation is omitted here. The PC printing function is validated after similar processing steps are executed.

Figure 20:
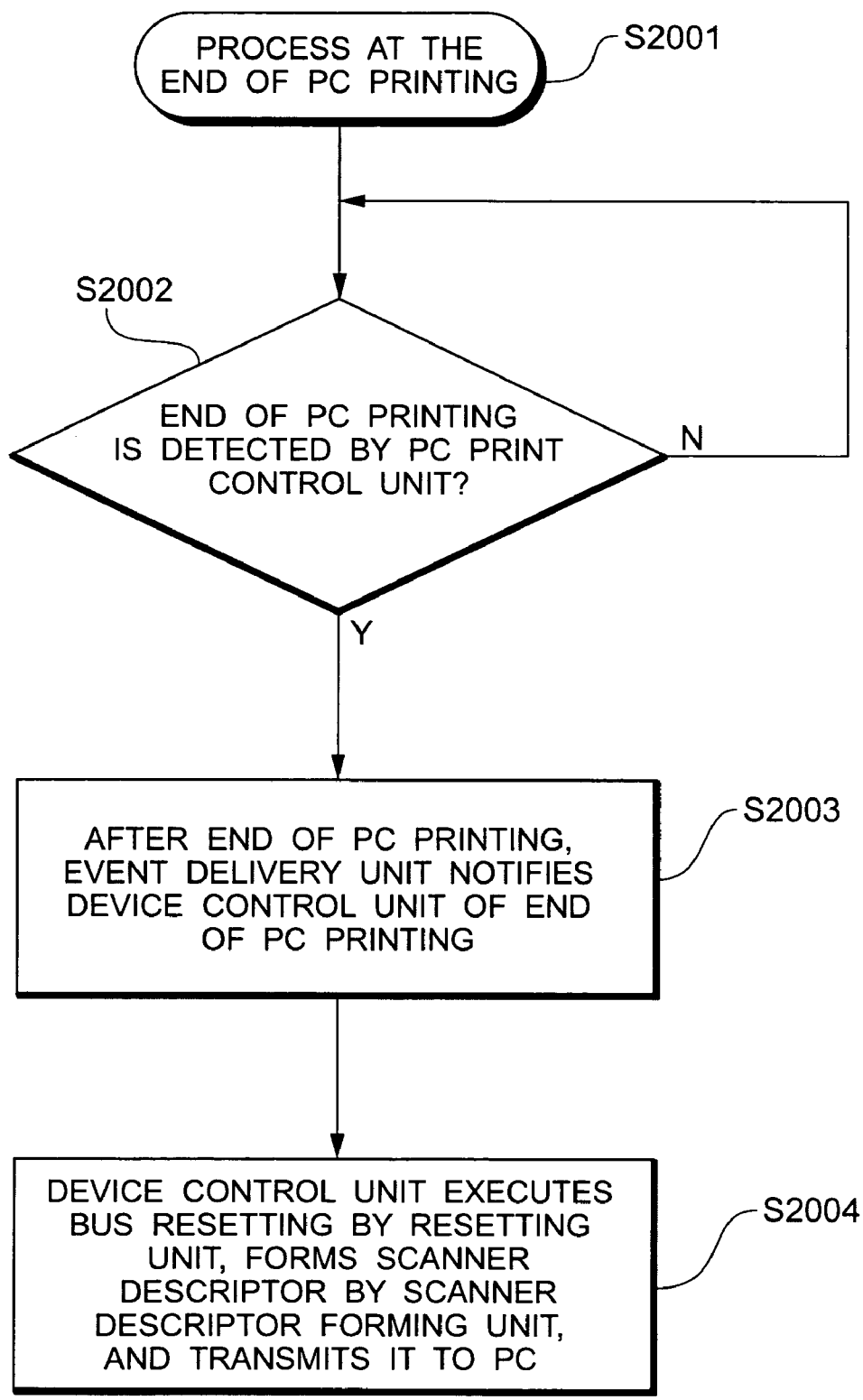
FIG. 20 is a flowchart showing the operation at the end of PC printing in the embodiment 5.

The operation when the PC-printer function has been selected will now be described with reference to a flowchart of FIG. 20.

The end of the PC printing operation is monitored (S2002). The PC print operation end event delivery unit 129 which detected the end of the PC printing operation transmits information indicative of the end of the printing operation to the USB control unit 113D (S2003).

The device control unit 1131 of the USB control unit 113D which received the PC printing operation end information selects the scanner descriptor forming unit 11315 from the two descriptor forming units by the multi-descriptor forming unit 11313 and transmits the scanner descriptor formed by the selected scanner descriptor forming unit 11315 to the PC 30 by the control transfer after the bus resetting was executed (S2004). Since the subsequent operation is similar to the contents described in the foregoing embodiment, its explanation is omitted here. The PC scanning function is validated after similar processing steps are executed.

According to the scanner apparatus 14 in the embodiment 5, when the end of the PC scanning operation is detected, the device control unit 1131 of the USB control unit 113D forms the device descriptor for allowing the scanner apparatus to function as a PC printing operation on the basis of the information from the PC scan operation end event delivery unit 128 and notifies the PC 30 of the device descriptor. When the end of the PC printing operation, the device control unit 1131 of the USB control unit 113D forms the device descriptor for allowing the scanner apparatus to function as a PC scanning printing operation on the basis of the information from the PC print operation end event delivery unit 129 and notifies the PC 30 of the device descriptor. For example, by presetting the function which is mainly used by the operator as a function to be made operative after completion of the function, when a desired function is finished, the function can be automatically switched to the function which is mainly used by the operator. The use efficiency of the operator can be improved.

[Embodiment 6]

The foregoing embodiment has been described with respect to the system, as an example, in which the scanner apparatus is USB-connected as a peripheral and the printer apparatus is USB-connected as a dependent peripheral. An embodiment 6 will now be described with respect to a system constructed in such a manner that, as shown in FIG. 21, a printer apparatus 60 is connected as a peripheral to a PC 80 through a USB cable 91 and a scanner apparatus 70 is connected as a dependent peripheral to the printer apparatus 60 through a USB cable 92.

Figure 22:
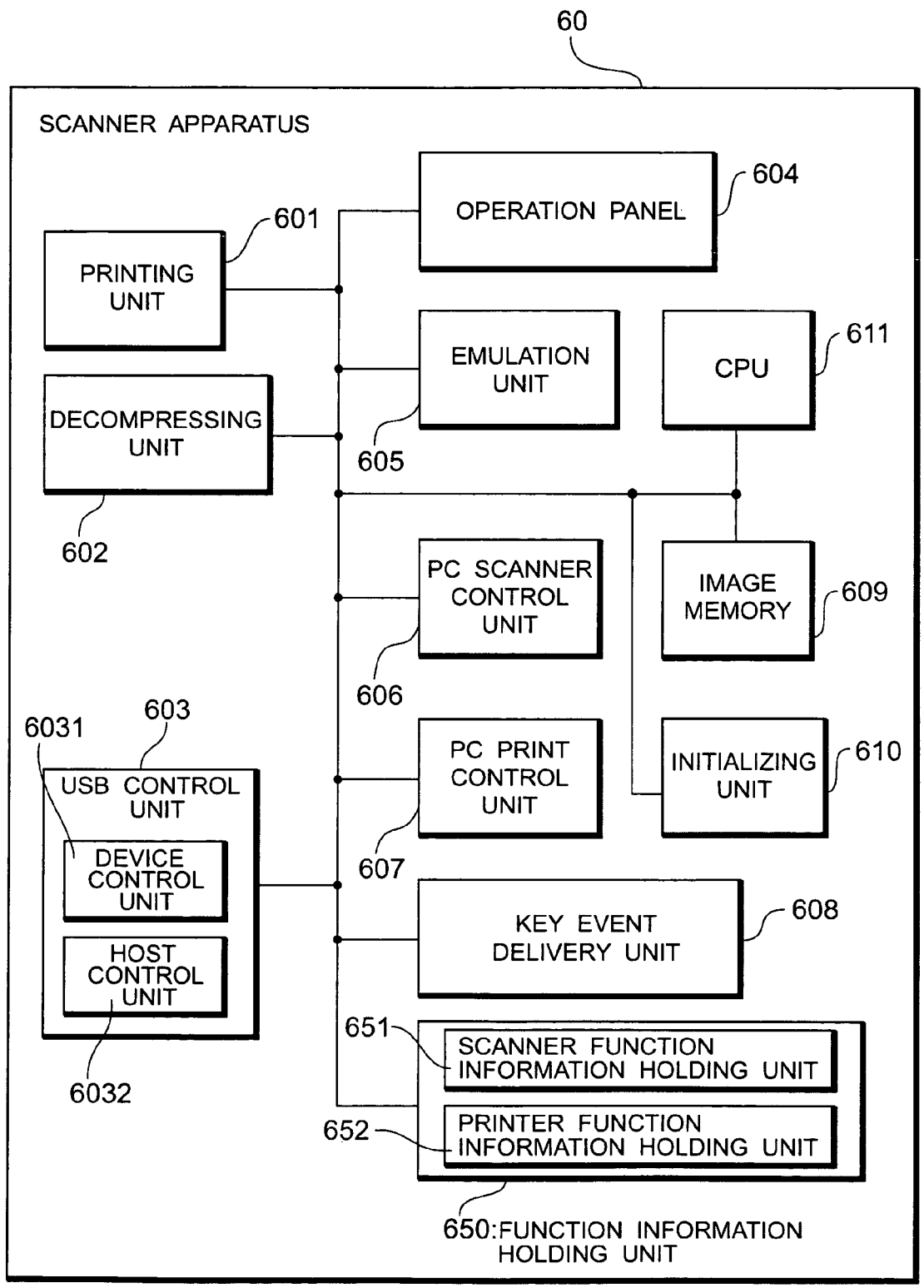
FIG. 22 is a constructional diagram of a printer apparatus which is used in the embodiment 6.

As shown in FIG. 22, the printer apparatus 60 has: a printing unit 601 for printing onto a sheet; a decompressing unit 602 for decompressing compressed print data; a USB control unit 603 which functions as one of the USB devices with respect to the PC 80, functions as a hub with respect to the scanner apparatus 70, and is used to make USB-connection in accordance with a USB protocol; an operation panel 604 on which a plurality of keys for making operation setting of the printer apparatus 60 by the operator and the like are provided; an emulation unit 605 for decoding a printer control language; a PC scanner control unit 606 which temporarily receives a control command for the PC scanner by the printer apparatus 60, transfers the received control command to the scanner apparatus 70, and is used to control the scanner apparatus so as to function as a PC scanner; a PC print control unit 607 for controlling the apparatus so as to function as a PC printer; an image memory 609 which is used as a work area for holding the print image data and executing the image process and the compressing process; an initializing unit 610 for forming the device descriptor of either the scanner device descriptor or the printer device descriptor at the time of initialization and transmitting the formed device descriptor to the PC 80; a key event delivery unit 608 for notifying a device control unit 6031, which will be explained hereinafter, of the USB control unit 603 that an arbitrary key on the operation panel 604 has been depressed; and a function information holding unit 650 for holding the printer function information and the scanner function information.

A CPU 611 makes substantial control of each of the above-mentioned units on the basis of the programs held in the ROM (not shown). For simplicity of explanation, the printer apparatus 60 will be described with respect to each of the foregoing functional blocks.

The function information holding unit 650 of the printer apparatus 601 has: a scanner function information holding unit 651 for holding the function information indicative of the functions of the scanner apparatus 70; and a printer function information holding unit 652 for holding the function information indicative of the functions of the printer apparatus 60. Either the function information held in the scanner function information holding unit 651 or the function information held in the printer function information holding unit 652 is read out when the device descriptor, which will be explained hereinafter, is formed.

Figure 23:
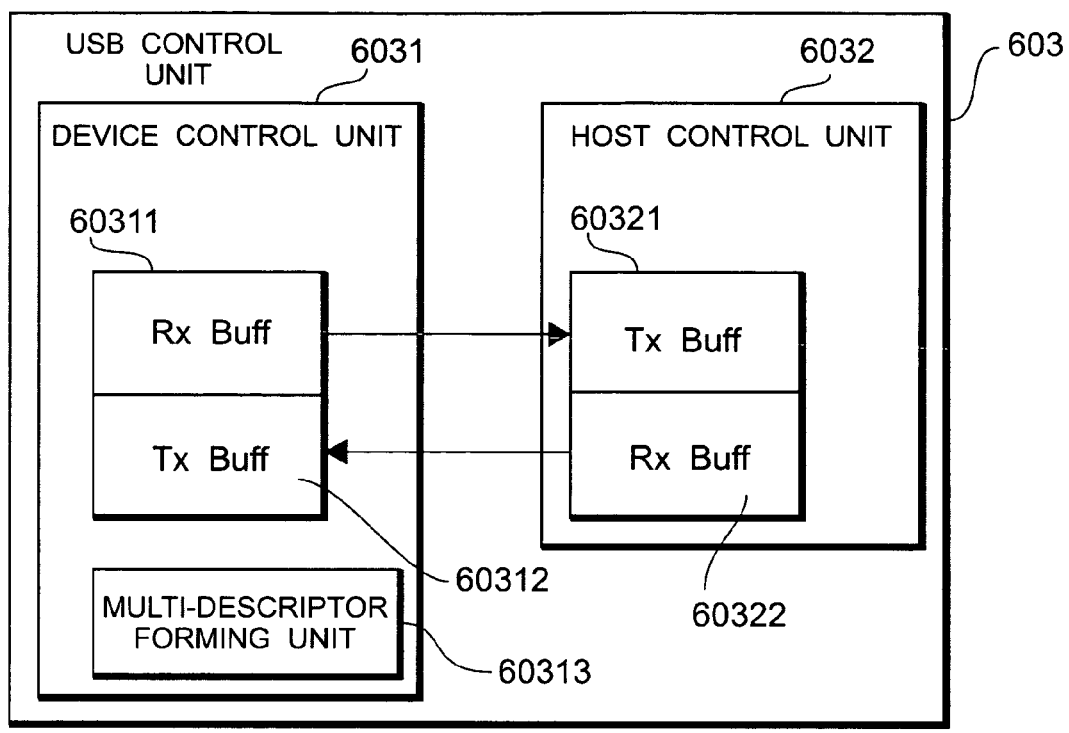
FIG. 23 is a constructional diagram of a USB control unit of the printer apparatus in the embodiment 6.

As shown in FIG. 23, the USB control unit 603 of the printer apparatus 60 is constructed by: the device control unit 6031 for functioning as one of the USB devices; and a host control unit 6032 for functioning as a hub.

The host control unit 6032 has: a Tx buffer (Tx Buff) 60321 for transmitting the data to the scanner apparatus 70; and an Rx buffer (Rx Buff) 60322 for receiving the data from the scanner apparatus 70.

The device control unit 6031 has: an Rx buffer (Rx Buff) 60311 for receiving the data from the PC 80; a Tx buffer (Tx Buff) 60312 for transmitting the data to the PC 80; and a multi-descriptor forming unit 60313 having a plurality of descriptor forming units (not shown) each for forming a device descriptor, which will be explained hereinafter. When the PC 80 and the scanner apparatus 70 make the USB-communication, the data held in the Rx buffer 60311 is transferred to the Tx buffer 60321 and the data held in the Rx buffer 60322 is transferred to the Tx buffer 60312.

When the operator presses the key (on the operation panel 604) which instructs the USB-communication between the PC 80 and the scanner apparatus 70, a device descriptor in which the scanner function information, which will be explained hereinafter, is shown is formed. The PC 80 is notified of the device descriptor. After that, the foregoing transfer control is made.

Figure 24:
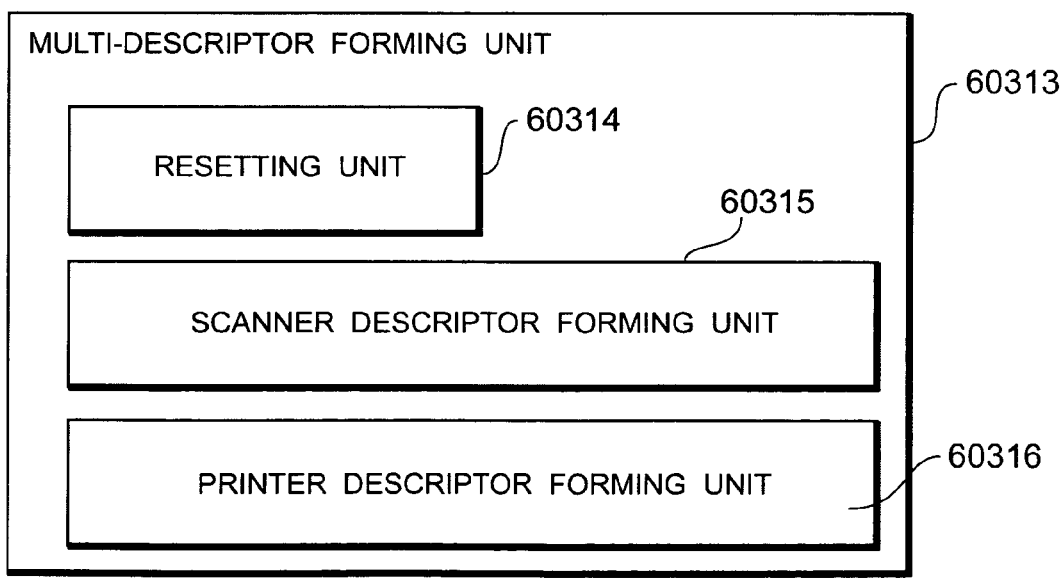
FIG. 24 is a constructional diagram of a multi-descriptor forming unit in the USB control unit in the embodiment 6.

The multi-descriptor forming unit 60313 will now be described. As shown in FIG. 24, the multi-descriptor forming unit 60313 is constructed by: a resetting unit 60314 for executing bus resetting in the USB-connection; a scanner descriptor forming unit 60315 for forming a scanner device descriptor; and a printer descriptor forming unit 60316 for forming a printer device descriptor.

To allow the PC 80 to control the scanner apparatus 70 by the scanner function through the printer apparatus 60, the scanner descriptor forming unit 60315 reads out the scanner function information from the scanner function information holding unit 651 in the function information holding unit 650 and forms the device descriptor in which the scanner function information is shown.

To allow the PC 80 to control the printer apparatus 60 by the printer function, the printer descriptor forming unit 60316 reads out the printer function information from the printer function information holding unit 652 in the function information holding unit 650 and forms the device descriptor in which the printer function information is shown. In this manner, the device descriptor is formed in accordance with the function to be controlled by the PC 80. The formed device descriptor is notified to the PC after the bus resetting in the USB-connection. The PC which received the notification specifies the communication partner destination on the basis of the function information shown in the device descriptor (makes device definition).

Figure 25:
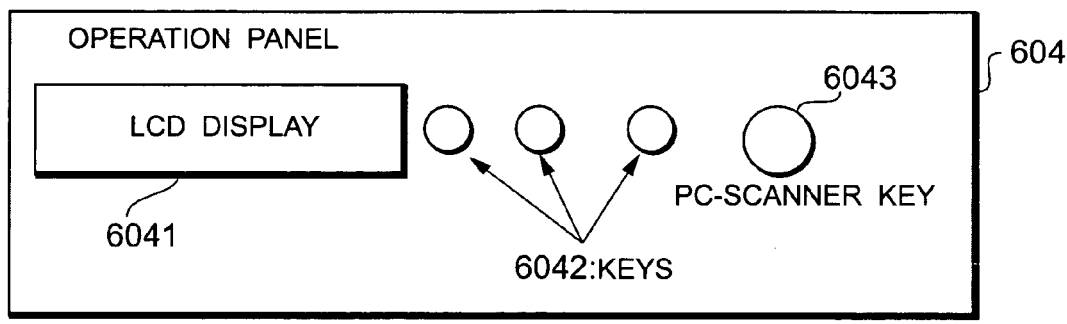
FIG. 25 is a layout example on the surface of an operation panel in the printer apparatus in the embodiment 6.

As shown in FIG. 25, the operation panel 604 of the printer apparatus 60 has: an LCD display 6041 for allowing the operator to set the operation; a plurality of pressing keys 6042; and a PC-scanner key 6043.

In correspondence to depressed ones of the plurality of keys 6042, the operation panel 604 outputs the selection signal (selection information) according to the pressed keys to the USB control unit 603. On the basis of the received selection signal, the multi-descriptor forming unit 60313 in the USB control unit 603 selects either the scanner descriptor forming unit 60315 or the printer descriptor forming unit 60316 and activates the selected forming unit. In other words, when the operator presses a use button of the scanner apparatus 70 by the operation panel 604, the scanner descriptor forming unit 60315 is activated. When he presses a use button of the printer apparatus 60, the printer descriptor forming unit 60316 is activated.

When the PC-scanner key 6043 is pressed, the operation panel 604 outputs a signal indicative of the PC-scan selection to the USB control unit 603. The USB control unit 603 which received the selection signal indicative of the selection of the PC-scanning function selects the scanner descriptor forming unit 60315 in the multi-descriptor forming unit 60313, activates the scanner descriptor forming unit 60315, and forms the device descriptor. The PC 80 is notified of the formed device descriptor after the bus resetting in the USB-connection is executed in the resetting unit 60314. Since the operation after the bus resetting is similar to that in the foregoing embodiment, its description is omitted here.

Figure 26:
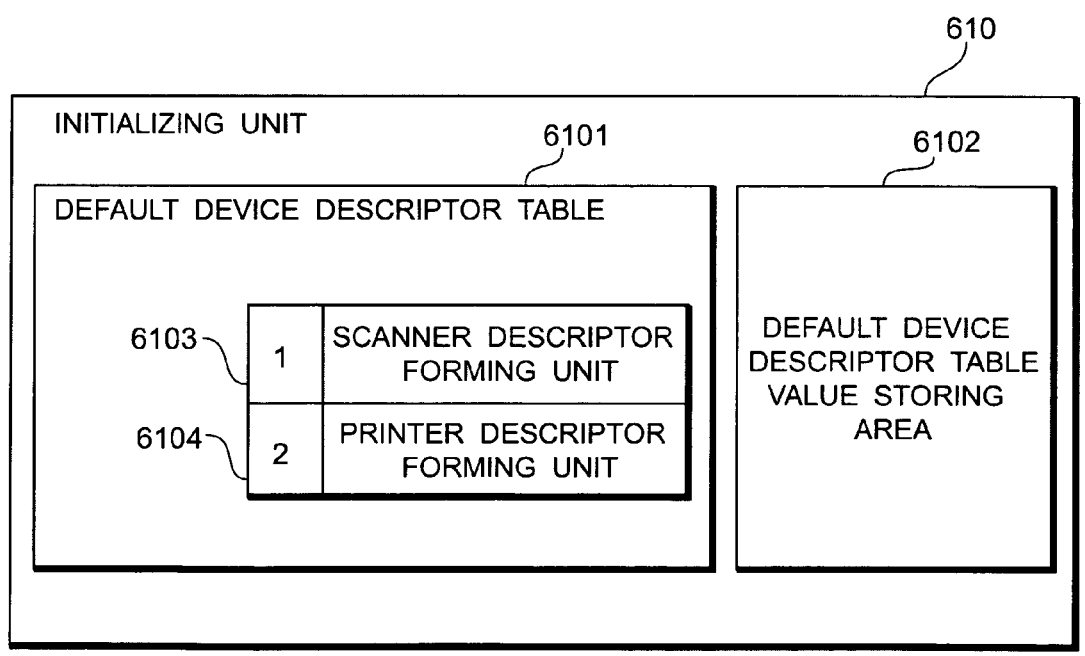
FIG. 26 is a constructional diagram of an initializing unit in the printer apparatus in the embodiment 6.

The initializing unit 610 of the printer apparatus 60 has a function for arbitrarily notifying the PC 80 of the device descriptor at the time of the initialization. As shown in FIG. 26, the initializing unit 610 has: a default device descriptor table 6101 in which the forming unit of the device descriptor (the scanner descriptor forming unit 60315 or the printer descriptor forming unit 60316) is made to correspond to a table number; and a default device descriptor table value storing area 6102 in which the table numbers to refer to the table upon initialization have been stored.

A corresponding table 6103 in which the scanner descriptor forming unit 60315 is made to correspond to the table No. 1 and a corresponding table 6104 in which the printer descriptor forming unit 60316 is made to correspond to the table No. 2 are shown in the default device descriptor table 1211.

An arbitrary table number has been stored in the default device descriptor table value storing area 6102. The forming unit of the device descriptor to be notified to the PC 80 upon initialization is selected in accordance with the table number shown in the default device descriptor table value storing area 6102.

Figure 27:
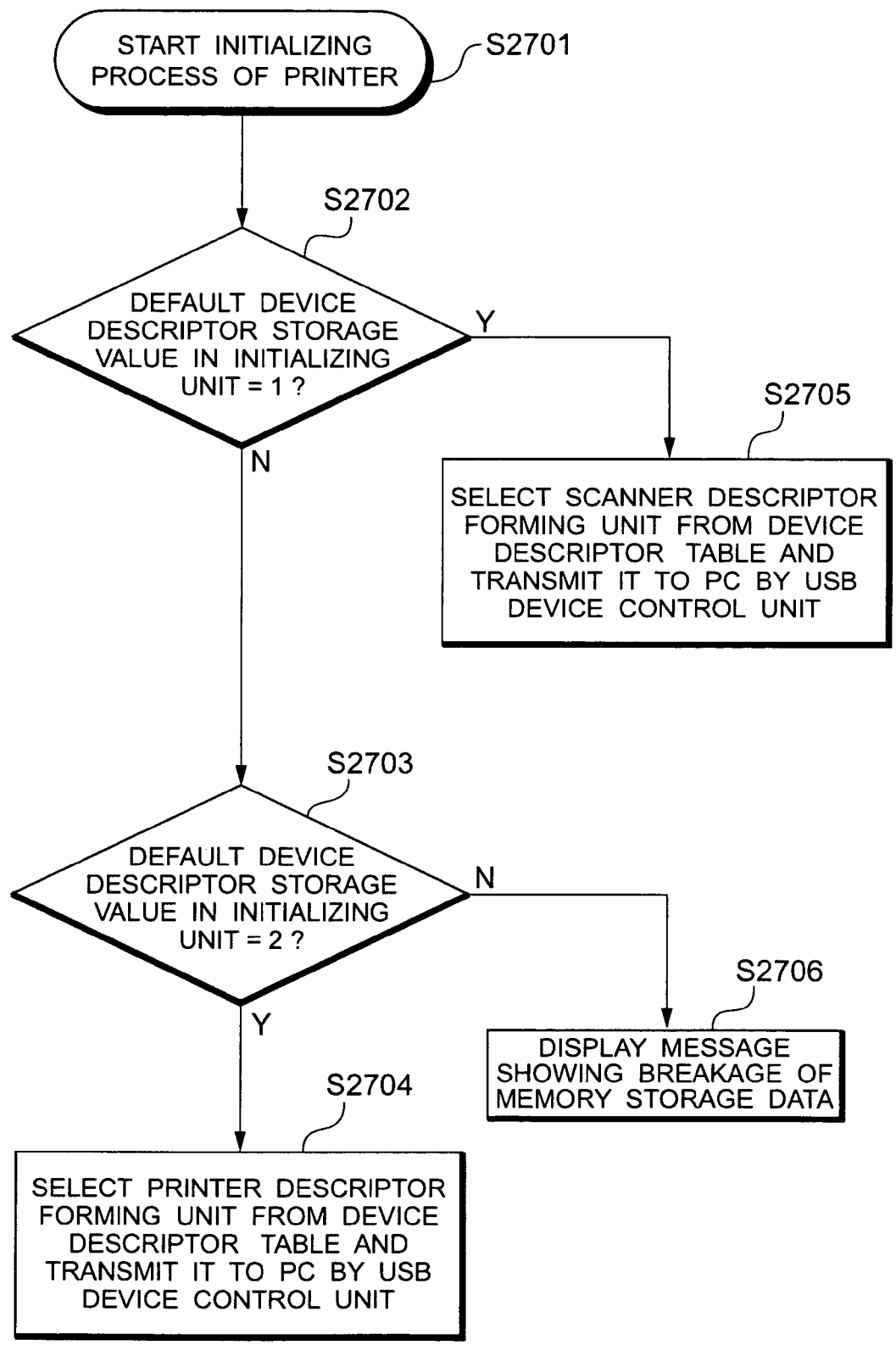
FIG. 27 is a flowchart showing the initializing operation in the embodiment 6.

The initializing operation of the initializing unit 610 of the printer apparatus 60 in the embodiment 6 will now be described with reference to a flowchart of FIG. 27.

First, when the initializing process of the scanner apparatus is started by the initializing unit 610 (step S2701), the value in the default device descriptor table value storing area 6102 is discriminated (S2702). If it is equal to "1", the activation of the scanner descriptor forming unit 60315 is selected by the default device descriptor table 6101. Thus, the device descriptor in which the scanner function information is shown is formed by the scanner descriptor forming unit 60315. After that, the scanner descriptor is transmitted to the PC 80 by the device control unit 6031 in the USB control unit 603 (S2705).

When the value in the default device descriptor table value storing area 6102 is equal to "2" (S2703), the activation of the printer descriptor forming unit 60316 is selected by the default device descriptor table 6101. The device descriptor in which the printer function information is shown is formed by the printer descriptor forming unit 60316. After that, the printer descriptor is transmitted to the PC 80 by the device control unit 6031 in the USB control unit 603 (S2704).

When the value in the default device descriptor table value storing area 6102 is not equal to "2", it is regarded that the value in the default device descriptor table value storing area 6102 is illegal, and a message showing that the memory storage data has been broken is displayed on the LCD display 6041 of the operation panel 604 (S2706).

Figure 28:
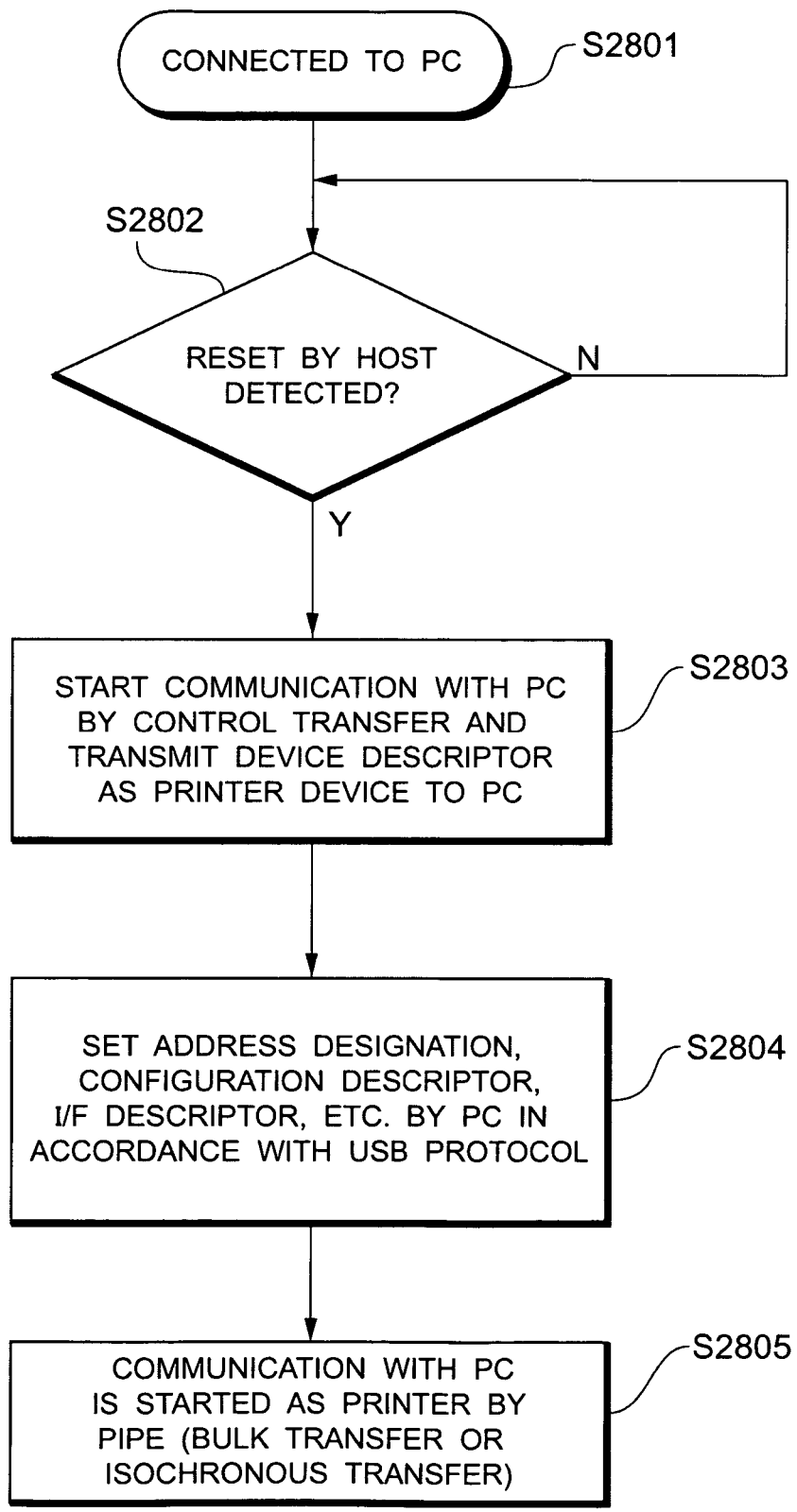
FIG. 28 is a flowchart showing the PC printing operation in the embodiment 6.

The operation when the printer apparatus 60 to which the scanner apparatus 70 has been connected is connected to the PC 80 by the hot plug-in will now be described with reference to a flowchart of FIG. 28.

When the scanner apparatus 70 is connected to the PC 80 by the hot plug-in (S2801), the PC 80 recognizes the connection of the new device and executes the bus resetting of the USB by the resetting unit 60314. When the resetting from the PC 80 is detected (S2802), the printer apparatus 60 activates the printer descriptor forming unit 60316. The printer descriptor is formed by the printer descriptor forming unit 60316.

The formed printer descriptor is transmitted from the printer apparatus 60 to the PC 80 by the control transfer (S2803). The PC 80 which obtained the printer descriptor executes the address designation and sets the configuration descriptor, the interface descriptor, and the like in accordance with the USB protocol (S2804). A pipe for a bulk transfer or isochronous transfer is established and the printer apparatus 60 starts the USB-communication with the PC 80 as a printer device by the pipe (S2805).

Figure 29:
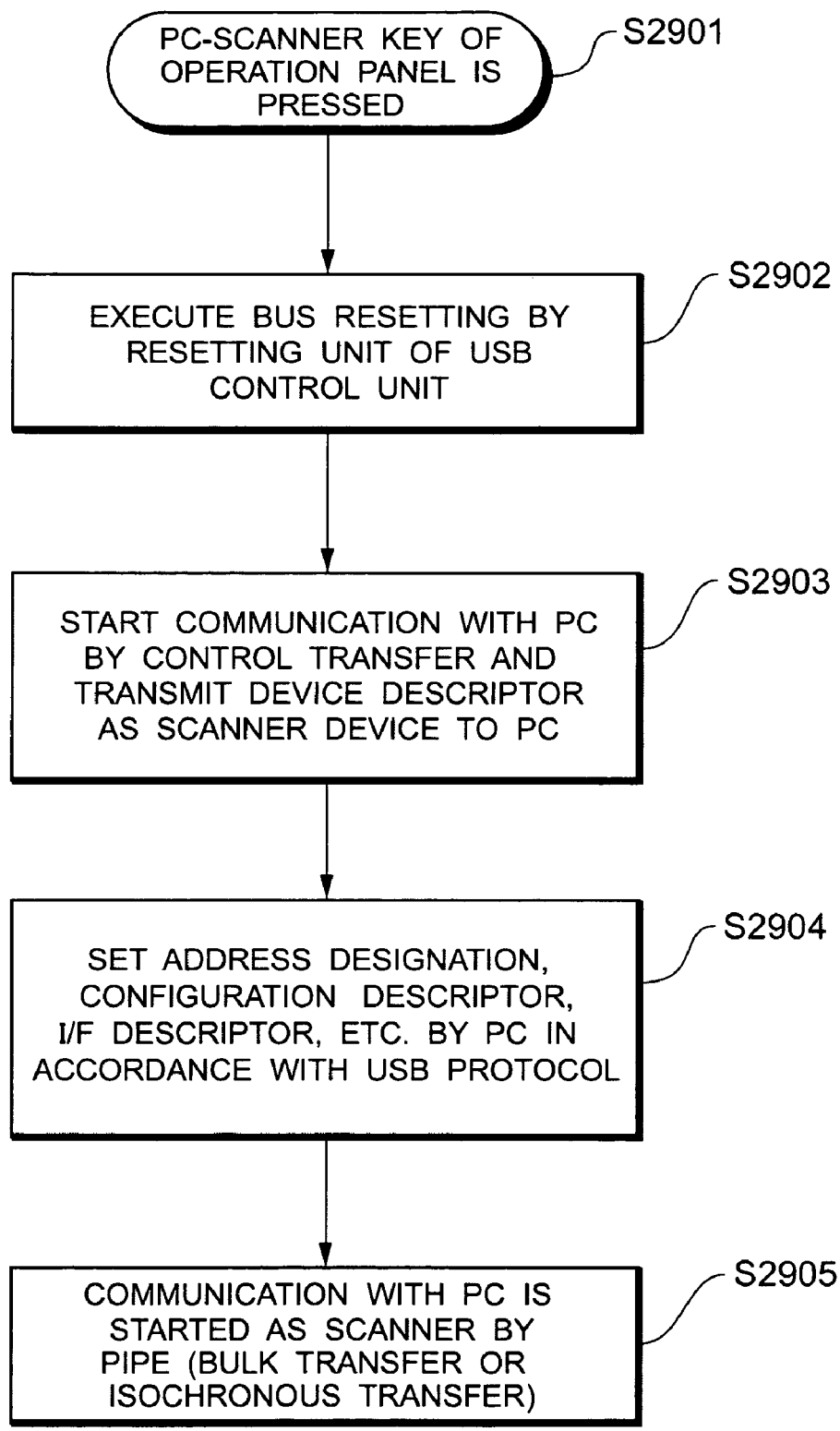
FIG. 29 is a flowchart showing the PC scanning operation in the embodiment 6.

The operation when the operator uses the printer apparatus 60 by the scanner function will now be described with reference to a flowchart of FIG. 29.

When the PC-scanner key 6043 on the operation panel 604 is pressed by the operator (S2901), the key event delivery unit 608 notifies the USB control unit 603 of information showing that the PC-scanner key 6043 has been depressed. The USB control unit 603 which received the information selects the scanner descriptor forming unit 60315. The selected scanner descriptor forming unit 60315 forms the scanner descriptor.

After that, when the bus resetting is executed by the resetting unit 60314 of the device control unit 6031 (S2902), the printer apparatus 60 starts the communication with the PC 80 by the control transfer. That is, the device control unit 6031 of the printer apparatus 60 transmits the scanner descriptor to the PC 80 (S2903). The PC 80 obtains the information called address designation, configuration descriptor, and interface descriptor and makes various settings on the basis of the scanner descriptor (S2904). By this setting, the transmission path called a pipe for the bulk transfer or isochronous transfer is determined. The printer apparatus 60 starts the USB-communication with the PC 80 as a printer device by the pipe (S2905).

According to the printer apparatus 60 in the embodiment 6, only one function information whose selection has been instructed is read out so as to make the USB-communication by the function whose selection has been instructed by the operator through the operation panel 604. When the device descriptor in which only such function information is shown is formed, the PC 80 is notified of this device descriptor after the bus resetting. Thus, the PC 80 can specify the communication partner destination on the basis of the single notified function information shown in the device descriptor, makes the device definition of the specified communication partner destination, and can make the USB-communication.

Therefore, according to the printer apparatus 60 in the embodiment 6, by notifying the PC 80 of the device descriptor in which only one function information is shown, the communication partner destination can be specified on the basis of the single function information shown in the device descriptor and the dedicated driver to select the function and issue the switching command of the connecting construction (vendor request) is unnecessary. Therefore, there is no need to develop the dedicated driver and, naturally, the troublesomeness to install the dedicated driver into the PC 80 can be eliminated.

Although the embodiments have been described by limiting the peripherals to the printer apparatus and scanner apparatus, the invention is not limited to them.

The invention can be applied to, for example, a monitor apparatus, a keyboard, a mouse, a facsimile apparatus, a storing device, an image server apparatus, and the like as peripherals.

Although the embodiments are not described with respect to the updating of the function information held in the function information holding unit 150 of the peripheral, for example, it is possible to construct the apparatus in such a manner that when the dependent peripheral is connected to the peripheral, the function information is obtained from the dependent peripheral, and the function information held in the function information holding unit 150 is updated or that the function information is obtained by communicating with an upper apparatus and the function information held in the function information holding unit 150 is updated. The function information held in the function information holding unit 150 can be also updated by exchanging a ROM in the peripheral.

The foregoing embodiments have been described with respect to the example in which the function information of the peripheral and the function information of the dependent peripheral are preliminarily held in the function information holding unit 150 of the peripheral, one of the function information is read out as necessary, and the device descriptor is formed and notified to the upper apparatus. However, the invention is not limited to such an example. For instance, it is possible to construct the apparatus in such a manner that the device descriptor for the peripheral and the device descriptor for the dependent peripheral are preliminarily held and the upper apparatus is notified of one of the device descriptors in accordance with the selecting instruction.

Although the foregoing embodiments have been described with respect to the initializing unit as an example in which the forming unit of the device descriptor is selected on the basis of the table number, the invention is not limited to such an example. For instance, the device descriptor can be also made to correspond to the table number. By this method, even if the device descriptor is not formed, the upper apparatus can be directly notified of the device descriptor which has been made to correspond to the table number.

The present invention is not limited to the foregoing embodiments but many modifications and variations are possible within the spirit and scope of the appended claims of the invention.

What is claimed is:

1. A peripheral for notifying a USB-connected upper apparatus of a device descriptor and allowing said upper apparatus to specify a communication partner destination on the basis of function information shown in said device descriptor, comprising:
   a peripheral function information holding unit which holds function information indicative of functions of said peripheral;
   a dependent peripheral function information holding unit which holds function information indicative of functions of a dependent peripheral which is USB-connected; and
   a USB control unit which reads out either the function information held in said peripheral function information holding unit or the function information held in said dependent peripheral function information holding unit on the basis of a selecting instruction and notifies said upper apparatus of the device descriptor in which the read-out function information is shown.

2. The peripheral according to claim 1, wherein
   when said peripheral is an image reading apparatus and said dependent peripheral is an image forming apparatus,
   said peripheral function information holding unit holds the function information indicative of an image reading function, and
   said dependent peripheral function information holding unit holds the function information indicative of an image forming function.

3. The peripheral according to claim 2, wherein said USB control unit has a multi-device descriptor forming unit which forms the device descriptor in which the function information which is read out by said selecting instruction is shown.

4. The peripheral according to claim 3, further comprising an original reading unit which reads an original, and
   wherein when it is detected that the original has been arranged, said original reading unit notifies said USB control unit of an original detection signal as said selecting instruction, and
   when said original detection signal is received, said USB control unit reads out the function information indicative of the image reading function.

5. The peripheral according to claim 4, further comprising a timer which notifies said USB control unit of a left-original detection signal as said selecting instruction when it is detected that said original has been arranged and left, and
   wherein when said left-original detection signal is received, said USB control unit reads out the function information indicative of the image forming function.

6. The peripheral according to claim 4, wherein
   said original reading unit reads out the arranged original and, when it is detected that there are no originals to be read, notifies said USB control unit of an end detection signal as said selecting instruction, and
   when said end detection signal is received, said USB control unit reads out the function information indicative of the image forming function.

7. The peripheral according to claim 3, further comprising a specific information extracting unit which analyzes a control command from said upper apparatus and extracts specific information, and
   wherein when said specific information is a command described by a control language of an image reading apparatus, said specific information extracting unit notifies said USB control unit of said command as said selecting instruction, and
   when said command is received, said USB control unit reads out the function information indicative of the image reading function.

8. The peripheral according to claim 7, wherein when information showing that a process based on said command has been finished is received as said selecting instruction, on the basis of said command, said USB control unit reads out the other function information which is not read out.

9. The peripheral according to claim 3, further comprising a specific information extracting unit which analyzes a control command from said upper apparatus and extracts specific information, and
   wherein when said specific information is a command described by a control language of an image forming apparatus, said specific information extracting unit notifies said USB control unit of said command as said selecting instruction, and
   when said command is received, said USB control unit reads out the function information indicative of the image forming function.

10. The peripheral according to claim 9, wherein when information showing that a process based on said command has been finished is received as said selecting instruction, on the basis of said command, said USB control unit reads out the other function information which is not read out.

11. The peripheral according to claim 1, wherein
    when said peripheral is an image forming apparatus and said dependent peripheral is an image reading apparatus, said peripheral function information holding unit holds the function information indicative of an image forming function, and said dependent peripheral function information holding unit holds the function information indicative of an image reading function.

12. The peripheral according to claim 11, wherein said USB control unit has a multi-device descriptor forming unit which forms the device descriptor in which the function information which is read out by said selecting instruction is shown.

13. The peripheral according to claim 12, further comprising an original reading unit which reads an original, and wherein when it is detected that the original has been arranged, said original reading unit notifies said USB control unit of an original detection signal as said selecting instruction, and when said original detection signal is received, said USB control unit reads out the function information indicative of the image reading function.

14. The peripheral according to claim 12, further comprising a specific information extracting unit which analyzes a control command from said upper apparatus and extracts specific information, and wherein when said specific information is a command described by a control language of an image reading apparatus, said specific information extracting unit notifies said USB control unit of said command as said selecting instruction, and when said command is received, said USB control unit reads out the function information indicative of the image reading function.

15. The peripheral according to claim 12, further comprising a specific information extracting unit which analyzes a control command from said upper apparatus and extracts specific information, and wherein when said specific information is a command described by a control language of an image forming apparatus, said specific information extracting unit notifies said USB control unit of said command as said selecting instruction, and when said command is received, said USB control unit reads out the function information indicative of the image forming function.

16. The peripheral according to claim 1, further comprising an operation panel which receives said selecting instruction, and wherein when said selecting instruction is received by said operation panel, said USB control unit executes bus resetting in the USB-connection with said upper apparatus before the notification of said device descriptor.

17. The peripheral according to claim 1, further comprising a specific information extracting unit which analyzes a control command from said upper apparatus and extracts specific information, and wherein when an instruction to execute bus resetting in the USB-connection with said upper apparatus is shown in said extracted specific information, said USB control unit executes said bus resetting.

18. The peripheral according to claim 1, wherein the USB-connection with said upper apparatus is hot plug-in connection, bus resetting in said USB-connection is executed by the hot plug-in connection.

19. A peripheral for notifying a USB-connected upper apparatus of a device descriptor and allowing said upper apparatus to specify a communication partner destination on the basis of function information shown in said device descriptor, comprising:

a peripheral function information holding unit which holds function information indicative of functions of said peripheral;

a dependent peripheral function information holding unit which holds function information indicative of functions of a dependent peripheral which is USB-connected; and a USB control unit which reads out either the function information held in said peripheral function information holding unit or the function information held in said dependent peripheral function information holding unit on the basis of a selecting instruction and notifies said upper apparatus of the device descriptor in which the read-out function information is contained, wherein said USB control unit has a host control section which executes a relay for communicating between said upper apparatus and said dependent peripheral, when said dependent peripheral is specified as said communication partner destination by said upper apparatus.

20. The peripheral according to claim 19, wherein said peripheral is a scanner; said dependent peripheral is a printer.

* * * * *